United States Patent
Weimer

(10) Patent No.: US 11,717,113 B2
(45) Date of Patent: Aug. 8, 2023

(54) COFFEE GRINDER SYSTEMS AND METHODS

(71) Applicant: Survival Light Products, Inc., Abbotsford (CA)

(72) Inventor: Todd Weimer, Abbotsford (CA)

(73) Assignee: SURVIVAL LIGHT PRODUCTS, INC., Abbotsford (CA)

( * ) Notice: Subject to any disclaimer, the term of this patent is extended or adjusted under 35 U.S.C. 154(b) by 100 days.

(21) Appl. No.: 17/304,623

(22) Filed: Jun. 23, 2021

(65) Prior Publication Data

US 2022/0007893 A1 Jan. 13, 2022

Related U.S. Application Data

(60) Provisional application No. 63/042,713, filed on Jun. 23, 2020.

(51) Int. Cl.
*A47J 42/46* (2006.01)
*A47J 42/40* (2006.01)
*A47J 42/50* (2006.01)
*A47J 42/04* (2006.01)

(52) U.S. Cl.
CPC .............. *A47J 42/46* (2013.01); *A47J 42/40* (2013.01); *A47J 42/50* (2013.01)

(58) Field of Classification Search
CPC .. A47J 42/02; A47J 42/04; A47J 42/46; A47J 42/38; A47J 42/40; A47J 42/50
See application file for complete search history.

(56) References Cited

U.S. PATENT DOCUMENTS

| | | |
|---|---|---|
| 2,663,450 A | 12/1953 | Bourcart |
| 4,139,114 A | 2/1979 | Long et al. |
| 5,950,913 A | 9/1999 | Rea et al. |

(Continued)

FOREIGN PATENT DOCUMENTS

| | | |
|---|---|---|
| CN | 202382180 U | 8/2012 |
| CN | 207604868 U * | 7/2018 |

(Continued)

OTHER PUBLICATIONS

English translate (CN207604868U), retrieved date Nov. 16, 2022.*
ISR, "International Searching Authority", PCT/CA2021/000052, dated Nov. 24, 2021, 8 pages.

*Primary Examiner* — Matthew Katcoff
*Assistant Examiner* — Mohammed S. Alawadi
(74) *Attorney, Agent, or Firm* — Schacht Law Office, Inc.; Michael R. Schacht

(57) ABSTRACT

A grinding system for grinding raw material to obtain ground material comprises a housing, a grinding assembly, and a first cap. The housing defines a grinding chamber, and the grinding assembly comprising a plurality of burrs. The grinding assembly is supported relative to the housing such that each of the plurality of burrs is arranged within the grinding chamber. The first cap is detachably attachable to the grinding assembly such that, with the first cap attached to the grinding assembly, rotation of the first cap relative to the housing causes rotation of at least one of the plurality of burrs relative to at least one other of the plurality of burrs and, with the first cap detached from the grinding assembly, the raw material may be arranged within the grinding chamber.

18 Claims, 24 Drawing Sheets

(56) References Cited

U.S. PATENT DOCUMENTS

| | | | |
|---|---|---|---|
| 6,112,537 | A | 9/2000 | Broadbent |
| 6,945,416 | B2 | 9/2005 | Manno |
| 7,210,596 | B1 | 5/2007 | Ruccolo |
| 7,654,402 | B2 | 2/2010 | Kusuma et al. |
| 8,727,157 | B2 | 5/2014 | Rances |
| 8,960,470 | B2 | 2/2015 | Tarble et al. |
| 8,991,659 | B2 | 3/2015 | Dey et al. |
| 10,232,980 | B1 | 3/2019 | Weimer |
| 2008/0011624 | A1 | 1/2008 | Robb et al. |
| 2012/0006922 | A1* | 1/2012 | Wilson .................. A47J 42/08 241/293 |
| 2013/0111726 | A1 | 5/2013 | Krieger |
| 2014/0069917 | A1 | 3/2014 | Meyers et al. |
| 2014/0312152 | A1* | 10/2014 | Pai ........................ A47J 42/46 241/169.1 |
| 2014/0346062 | A1 | 11/2014 | Bukhari et al. |
| 2014/0360908 | A1 | 12/2014 | Sorensen et al. |
| 2015/0048085 | A1 | 2/2015 | Brown et al. |
| 2015/0158658 | A1 | 6/2015 | Anelevitz et al. |
| 2015/0327727 | A1 | 11/2015 | Wu |
| 2017/0332831 | A1* | 11/2017 | Lee .................. A47G 19/2205 |
| 2020/0054162 | A1* | 2/2020 | Cheng .................. A47J 42/34 |

FOREIGN PATENT DOCUMENTS

| | | |
|---|---|---|
| CN | 207604868 U | 7/2018 |
| DE | 19914753 A1 | 8/2000 |
| DE | 19914753 C2 | 4/2003 |
| FR | 2735108 A1 | 12/1996 |
| GB | 2353264 A | 2/2001 |
| JP | 61194328 | 12/1986 |
| WO | 2010087754 A1 | 8/2010 |
| WO | 2012113025 A1 | 8/2012 |

* cited by examiner

COFFEE GRINDER SYSTEMS AND METHODS

RELATED APPLICATIONS

This application U.S. patent application Ser. No. 17/304,623 filed Jun. 23, 2021, claims benefit of U.S. Provisional Application Ser. No. 63/042,713 filed Jun. 23, 2020, the contents of which are incorporated herein by reference.

TECHNICAL FIELD

The present invention relates to a device that is intended to store and grind coffee beans.

BACKGROUND

Whole coffee beans are typically ground to obtain ground coffee prior to being used to make a coffee drink. Generally speaking, whole coffee beans are fed between the grinding members typically referred to as burrs. At least one of the burrs is typically movable, and coffee grinders typically include a fixed burr and a movable burr. The coffee beans are introduced between the burrs while at least one of the burrs (e.g., the movable burr) is rotated or otherwise displaced relative to the fixed burr to grind the whole coffee into smaller particles appropriate for the making of coffee drinks.

Typical coffee machines thus require at least one of the burrs to be moved, typically rotated, to grind whole coffee beans. Coffee grinders often include an electric motor for rotating one or both of the burrs. Alternatively, coffee grinders can be configured to allow at least one of the burrs to be rotated manually for use in situations in which electricity is unavailable (e.g., camping). The present invention is of particular significance when applied to the manual grinding of coffee, and that application of the present invention will be described herein.

Manually coffee grinders typically use a crank to allow a typical person to generate sufficient force to grind whole coffee beans between a fixed burr and a movable burr. Often, a detachable crank handle is provided to allow the typical user to grind coffee using a manual coffee grinder. And given that manual coffee grinders are typically used at remote locations, manual coffee grinders should be also lightweight and compact to facilitate transportation and simple to use and clean.

Therefore, it can be appreciated that there exists a need for a more practical and functional way to grind coffee that is lightweight, compact, and simple use and without the use of a crank handle that is a separate component from the grinding mechanism.

RELATED ART

The use of portable coffee grinders is known and referenced in prior art. More specifically, coffee grinders have been used for many years for both domestic and outdoor use.

SUMMARY

The present invention may be embodied as a grinding system for grinding raw material to obtain ground material. The grinding system comprises a housing defining a grinding chamber, a grinding assembly comprising a plurality of burrs, and a first cap. The grinding assembly is supported relative to the housing such that each of the plurality of burrs is arranged within the grinding chamber. The first cap is detachably attachable to the grinding assembly such that, with the first cap attached to the grinding assembly, rotation of the first cap relative to the housing causes rotation of at least one of the plurality of burrs relative to at least one other of the plurality of burrs and, with the first cap detached from the grinding assembly, the raw material may be arranged within the grinding chamber.

The present invention may also be embodied as a method of grinding raw material to obtain ground material comprising the following steps. A housing defining a grinding chamber is provided. A grinding assembly comprising a plurality of burrs is provided. A first cap is provided. The grinding assembly is supported relative to the housing such that each of the plurality of burrs is arranged within the grinding chamber. The first cap is detachably attached from the grinding assembly. With the first cap detached from the grinding assembly, the raw material is arranged within the grinding chamber. The first cap is detachably attached to the grinding assembly. With the first cap attached to the grinding assembly, rotating the first cap relative to the housing to cause rotation of at least one of the plurality of burrs relative to at least one other of the plurality of burrs.

The present invention may also be embodied as a grinding system for grinding raw material to obtain ground material comprising a housing, a grinding assembly, and a first cap. The housing defines a grinding chamber. The grinding assembly comprising a shaft member supported for axial rotation about a longitudinal axis relative to the housing and a plurality of burrs. The first cap comprises a release button supported for movement between first and second positions relative to the first cap. The grinding assembly is supported relative to the housing such that each of the plurality of burrs is arranged within the grinding chamber. When in the first position, the release button inhibits movement of the first cap along the longitudinal axis relative to the housing while allowing axial rotation of the first cap about the longitudinal axis relative to the housing. When in the second position, the release button allows movement of the first cap along the longitudinal axis relative to the housing to allow the first cap to be detached from the housing. With the first cap attached to the grinding assembly, rotation of the first cap relative to the housing causes rotation of at least one of the plurality of burrs relative to at least one other of the plurality of burrs, and, with the first cap detached from the grinding assembly, the raw material may be arranged within the grinding chamber.

DETAILED DESCRIPTION

Figure 1:
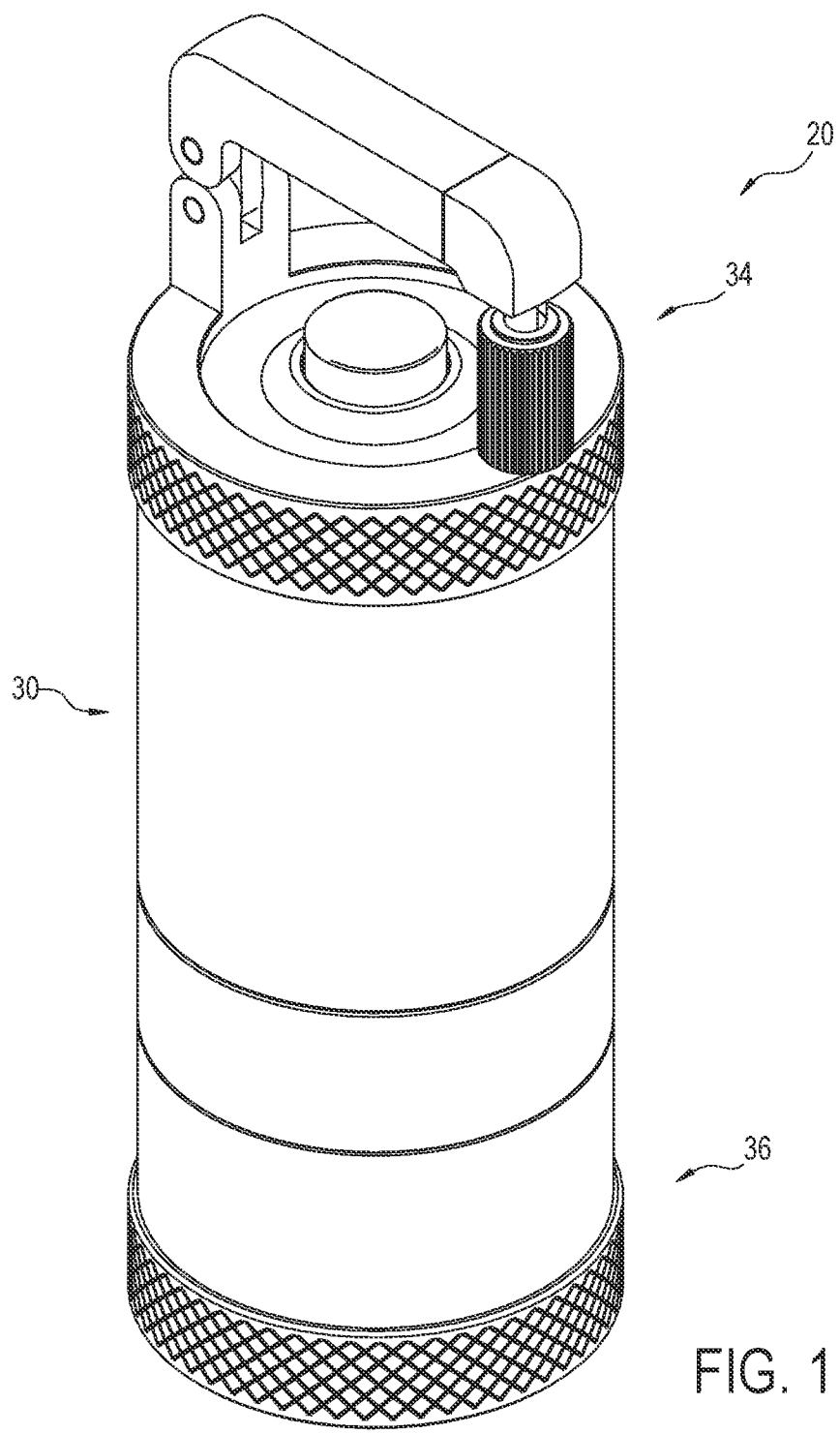
FIG. 1 Is a perspective view of a first example portable coffee grinder of the present invention.
Figure 2:
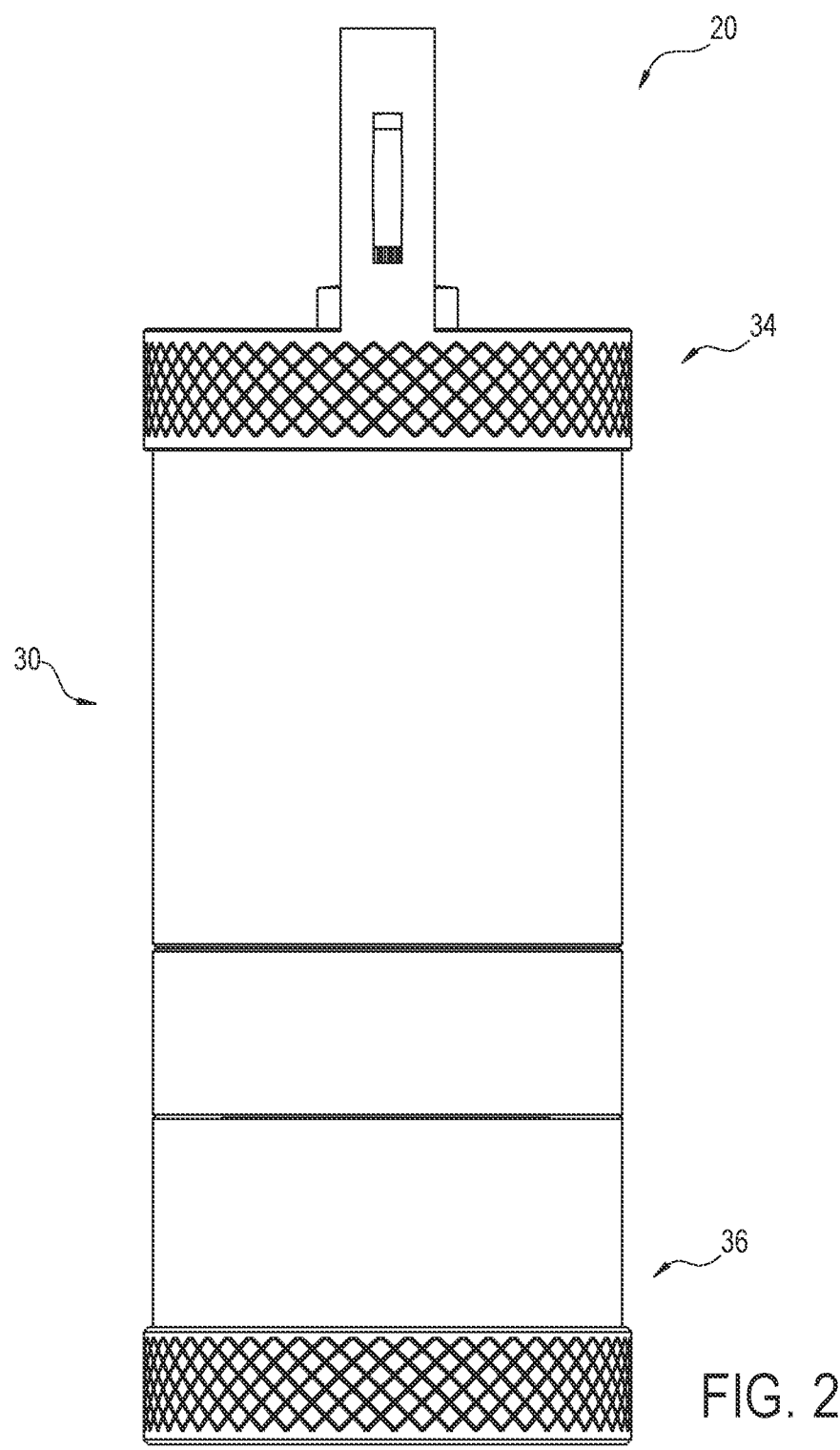
FIG. 2 is a first side elevation view of the first example coffee grinder with a handle assembly thereof in a locked configuration.
Figure 3:
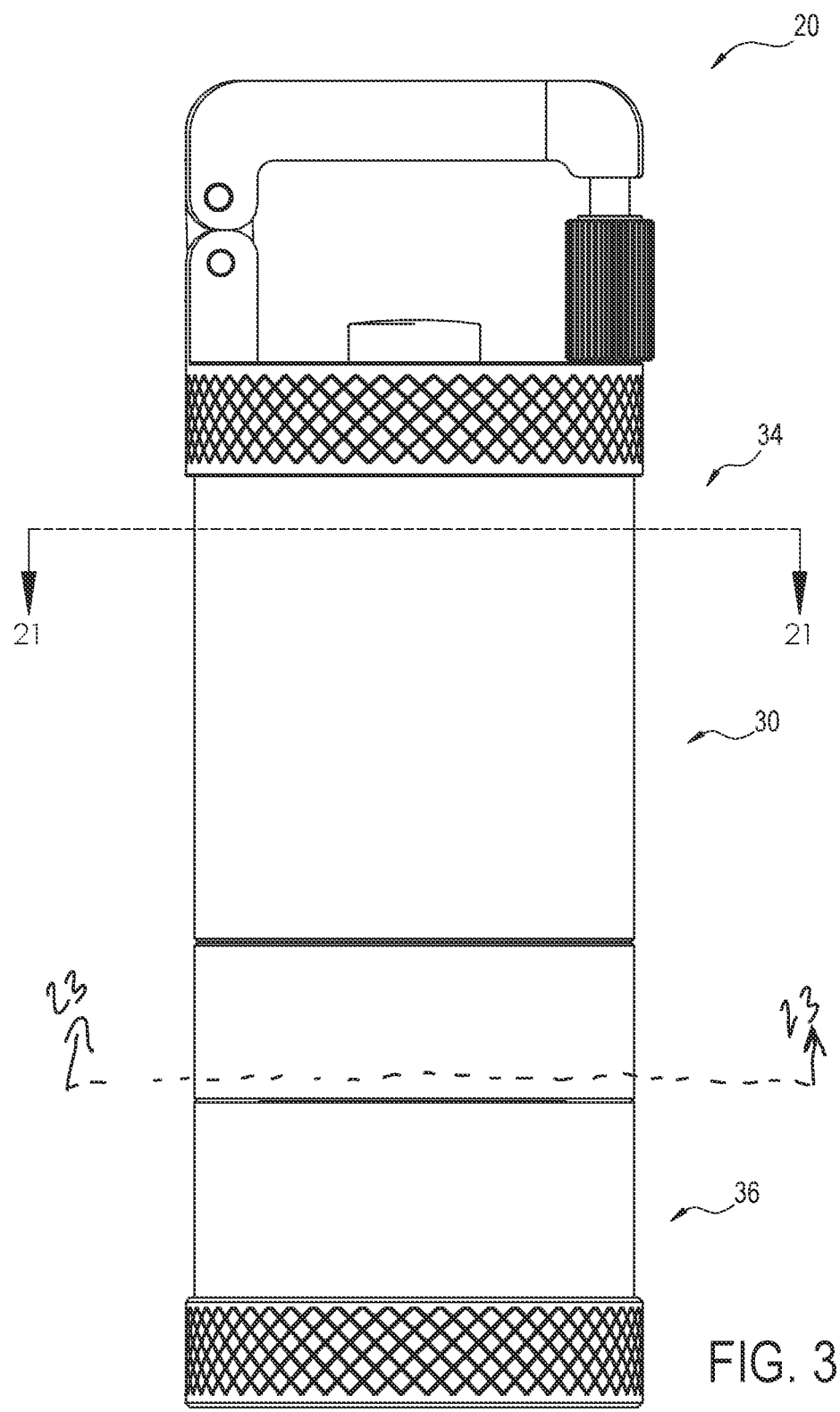
FIG. 3 is a front elevation view of the first example coffee grinder, the rear view being a mirror image thereof.
Figure 4:
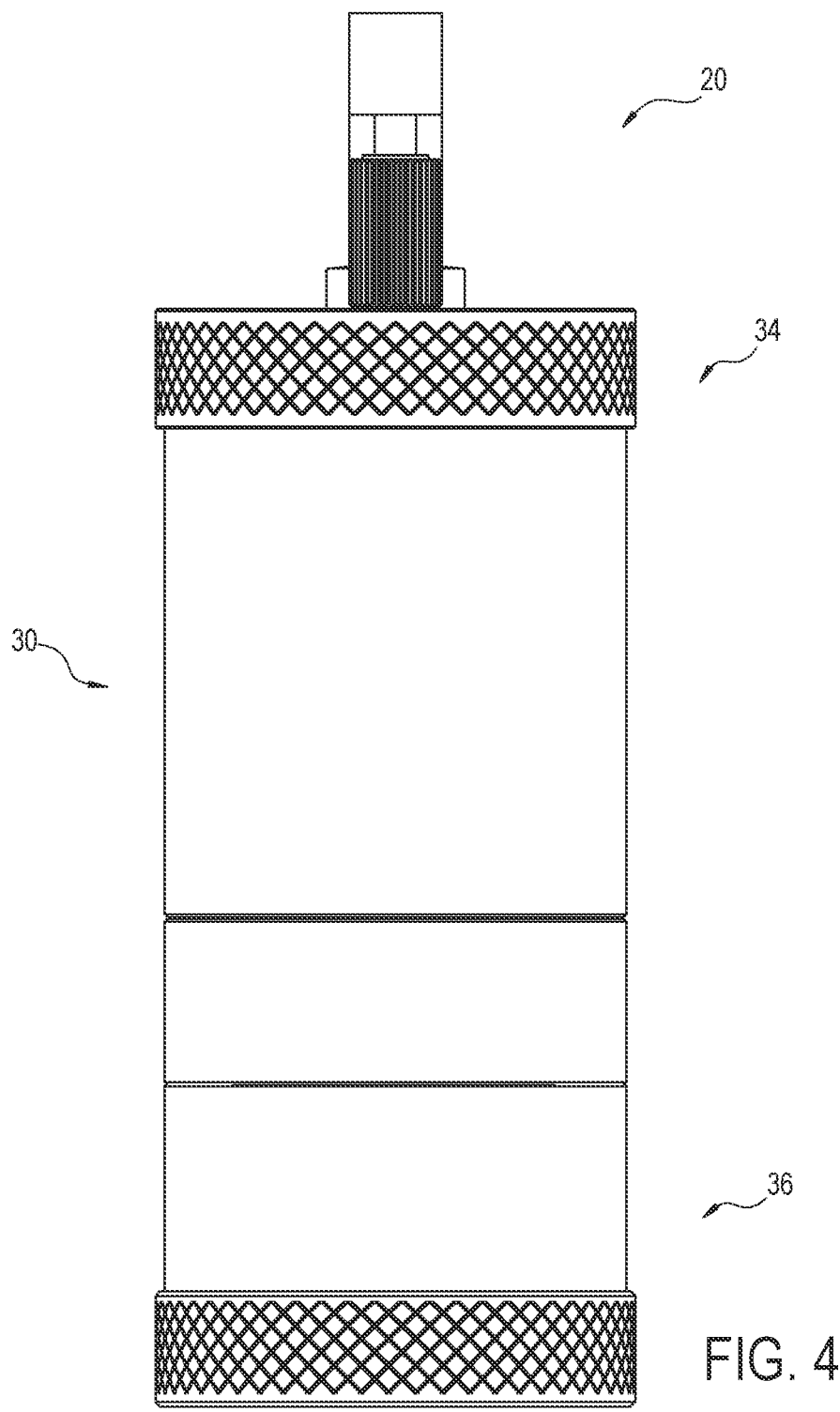
FIG. 4 is a second side elevation of the first example coffee grinder.
Figure 5:
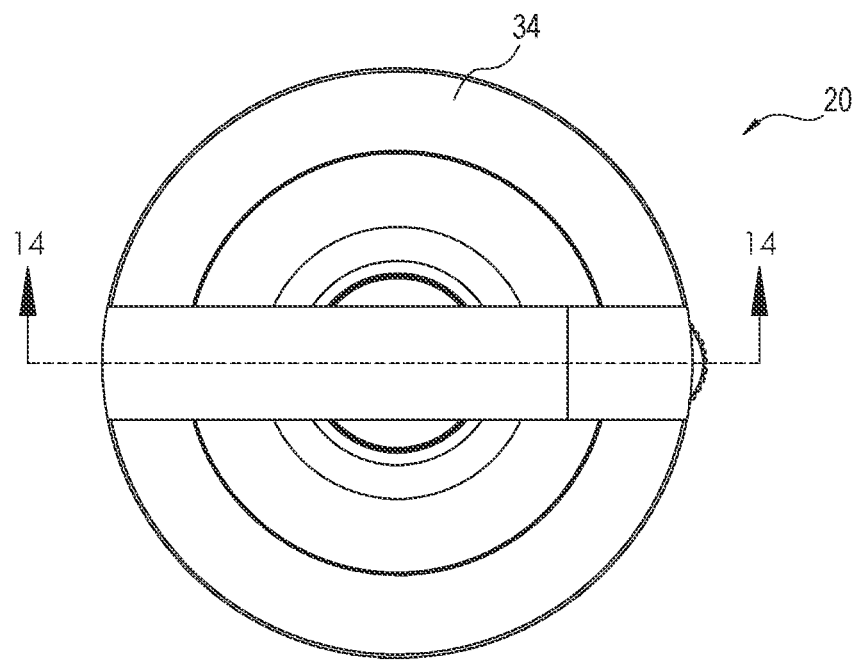
FIG. 5 is a top plan view of the first example coffee grinder.
Figure 6:
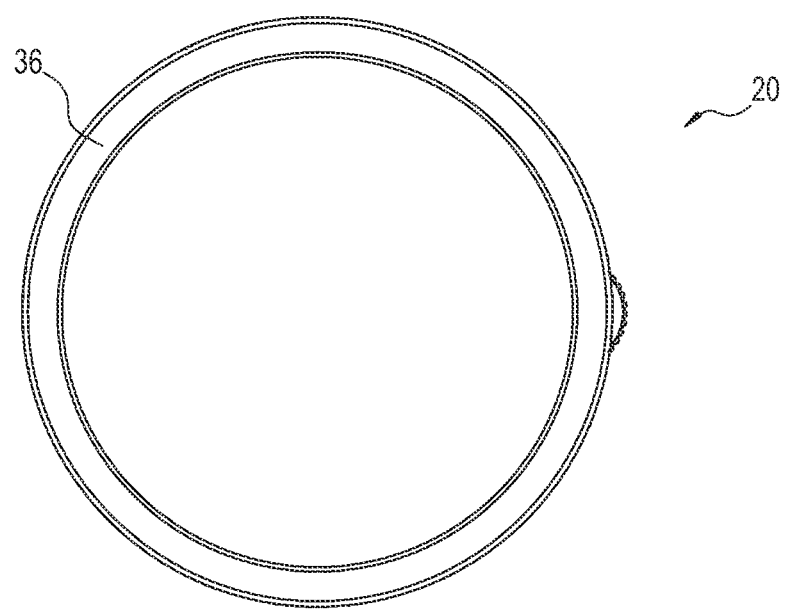
FIG. 6 is a bottom plan view of the first example coffee grinder.

Referring initially to FIGS. 1-11 of the drawing, depicted therein is a first example coffee grinder 20 constructed in accordance with, and embodying, the principles of the present invention. The example coffee grinder 20 defines a system axis 22.

Figure 13A:
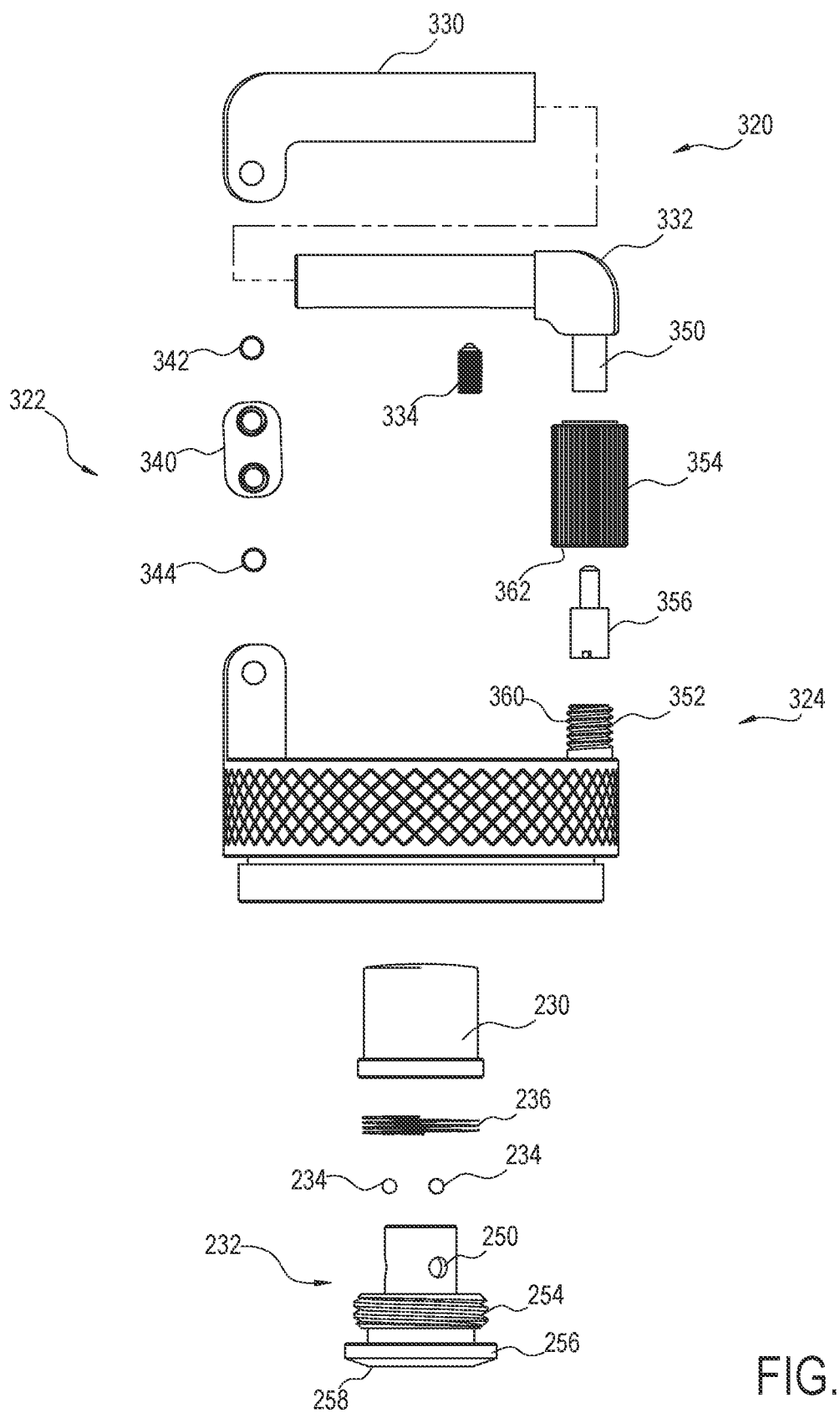
FIGS. 13A-13C are an exploded view illustrating the parts of the first example coffee grinder.
Figure 13B:
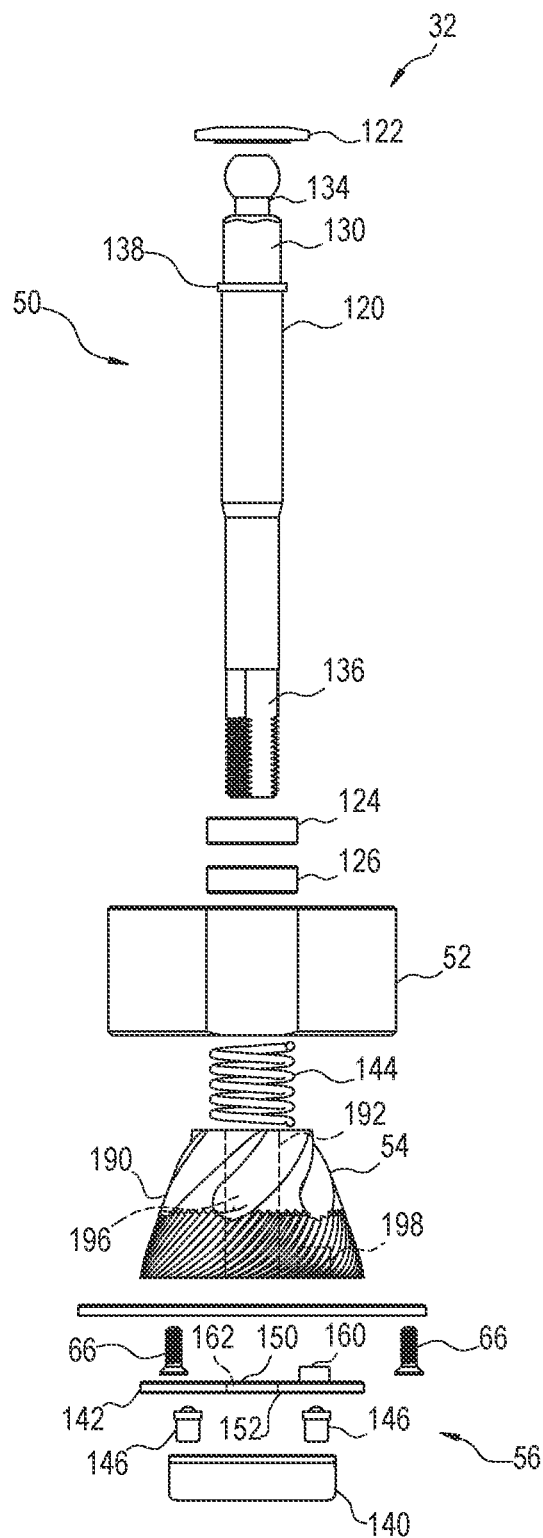
Figure 13C:
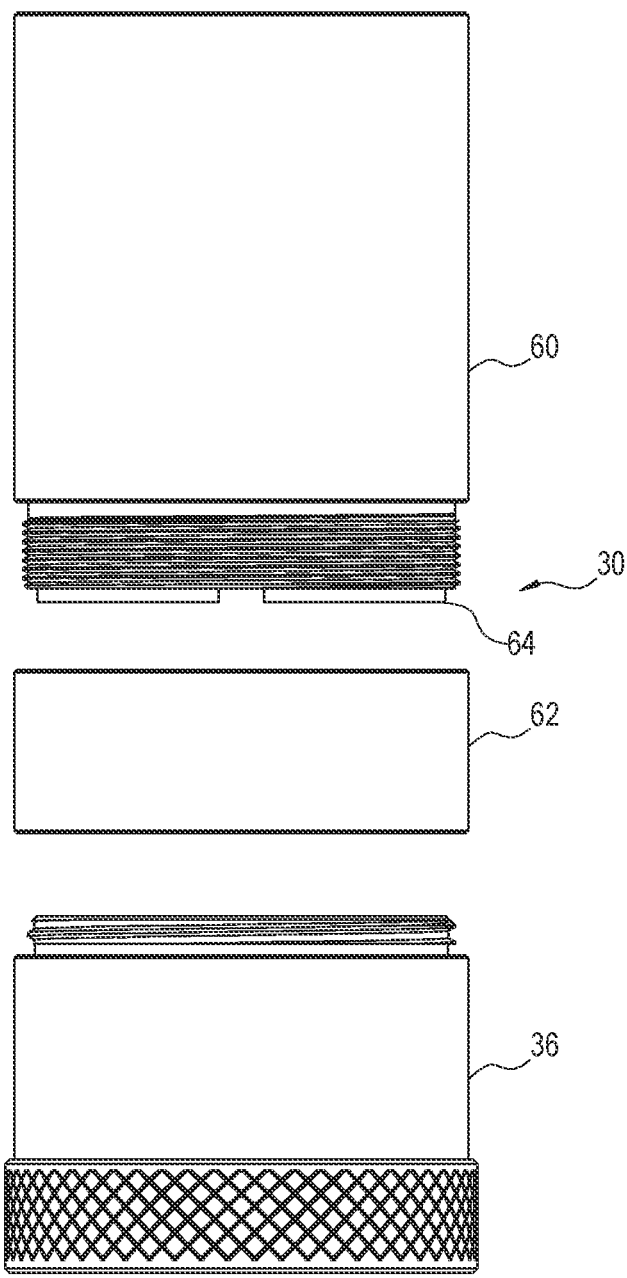
Figure 14:
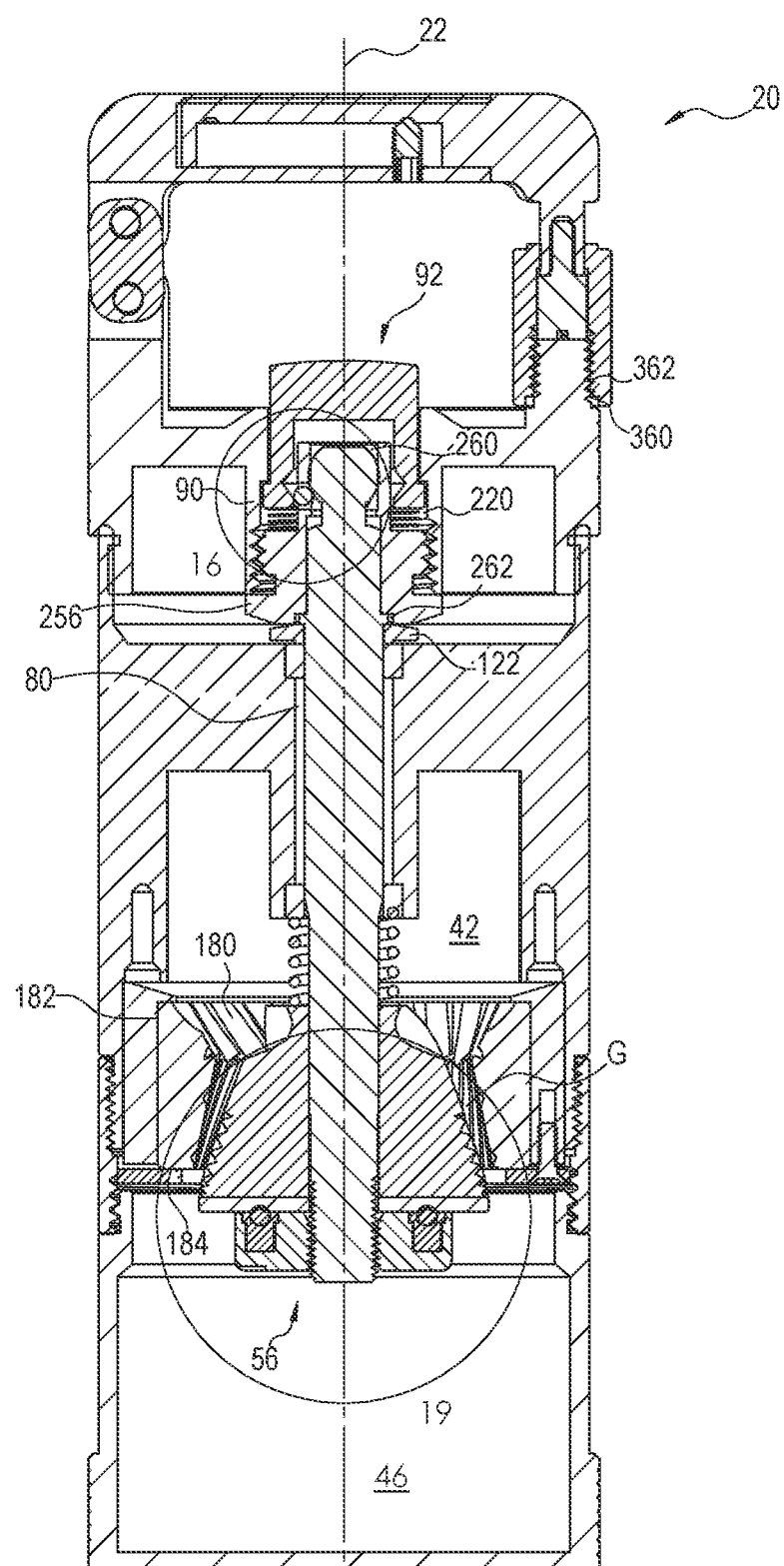
FIG. 14 is a section view taken along lines 14-14 in FIG. 5 illustrating a release button in a normal (un-depressed) position.

Referring now to FIGS. 13A-13C and 14-20, the example coffee grinder 20 comprises a housing 30 (FIG. 13C), a grinding assembly 32 (FIG. 13B), a first cap 34 (FIG. 13A), and a second cap 36 (FIG. 13C). FIG. 14 illustrates that the example housing 30 defines an inlet opening 40, a grinding chamber 42, an outlet opening 44, and an outlet chamber 46. FIGS. 13B and 14 illustrate that the grinding assembly 32 comprises a shaft assembly 50, a fixed burr member 52, a movable burr member 54, and a burr adjustment system 56. As shown in FIGS. 13C and 14, the example housing 30 comprises a first housing member 60, a second housing member 62, a fixed burr retaining ring 64, and ring screws 66.

The first housing member 60 defines a shaft support 70 supported within the grinding chamber 42 by support arms 72 and a fixed burr support surface 74. The example shaft support 70 defines a shaft passageway 80 and first and second bearing notches 82 and 84. FIGS. 13A and 14 illustrate that the example first cap 34 defines a release support portion 90, a release assembly 92, and a rotation assembly 94.

The first example coffee grinder 20 is illustrated in a storage configuration with the first and second caps 34 and 36 attached to the housing 30 in FIGS. 1-6. The first example coffee grinder 20 is illustrated being reconfigured between the storage configuration and a grinding configuration in FIGS. 7-10.

Figure 11:
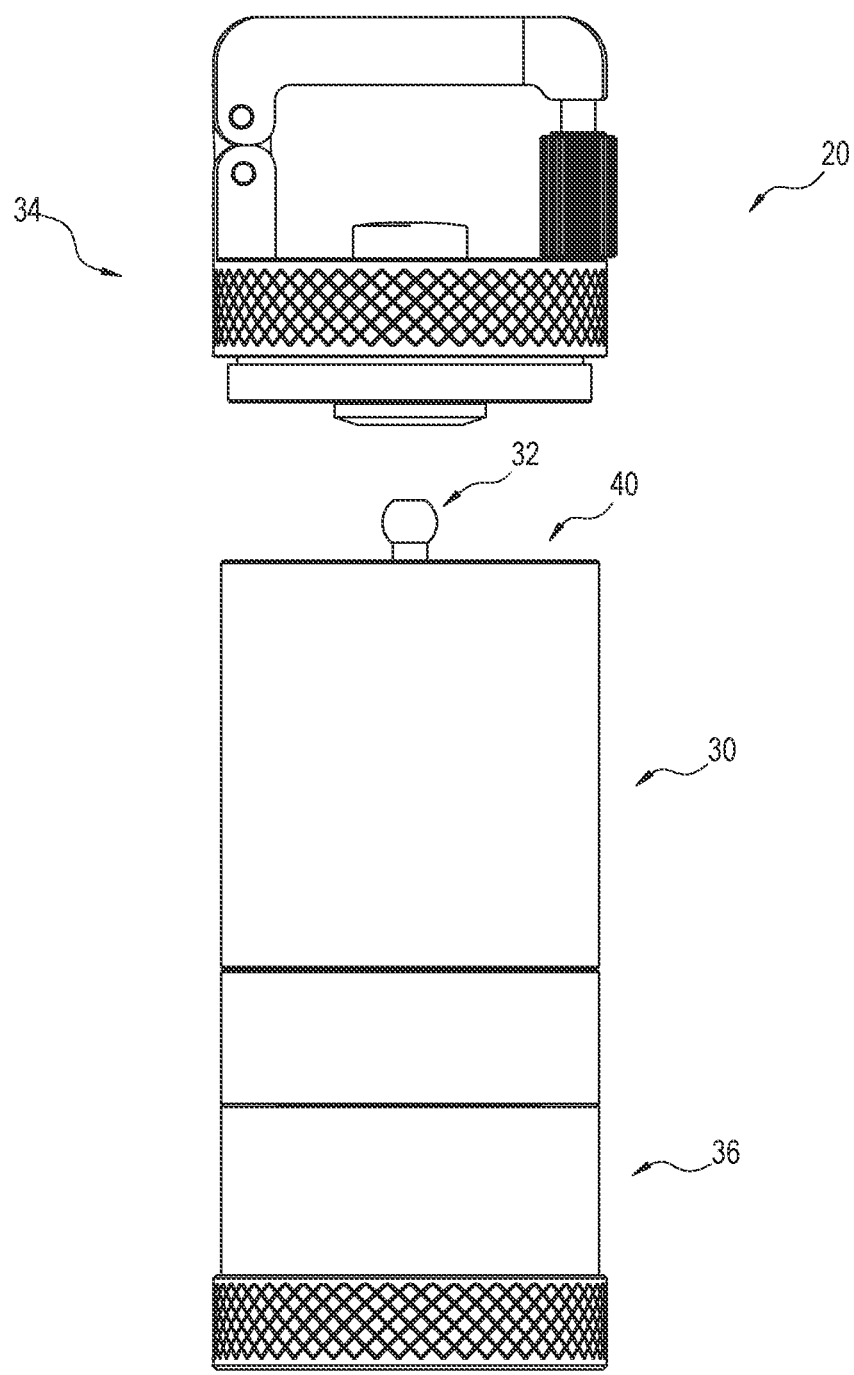
FIG. 11 is a front elevation view of the first example coffee grinder in a loading configuration.

The first example coffee grinder 20 is illustrated in a loading configuration in FIG. 11 with the first cap 34 removed from the housing 30 to allow unground coffee to be introduced into the grinding chamber 42 through the inlet opening 40. Operation of the release assembly 92 allows removal of the cap 34 from the housing 30.

Figure 10:
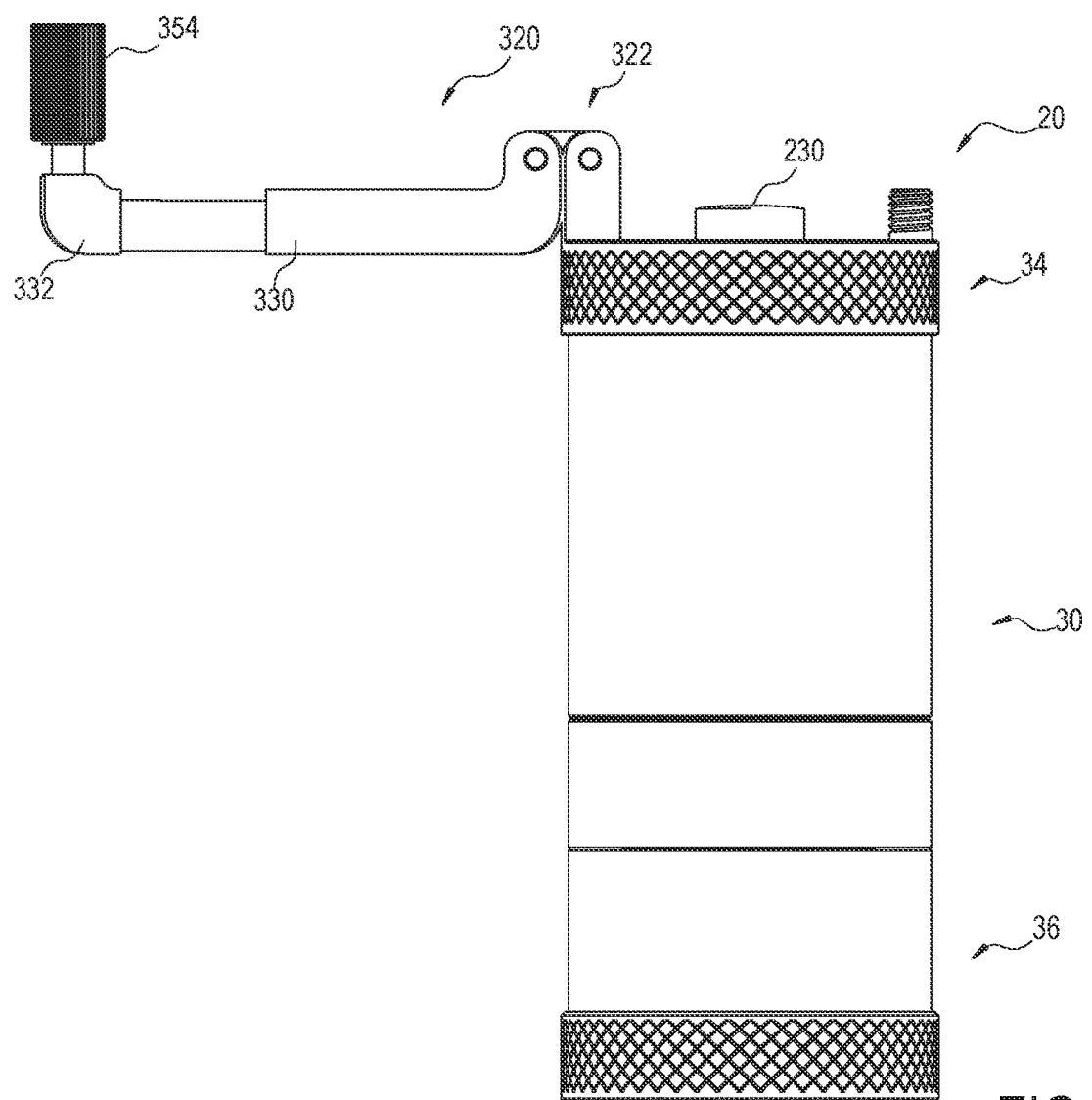
FIG. 10 is a front elevation view of the first example coffee grinder illustrating the handle assembly thereof in an outward, extended configuration.

When the first example coffee grinder 20 is in the grinding configuration as shown in FIG. 10, the rotation assembly 94 is operated to rotate the movable burr 44 relative to the fixed burr 52 to grind the unground coffee in the grinding chamber 42 an allow the ground coffee to pass through the outlet opening 44 and fall into the outlet chamber 46.

The first example coffee grinder 20 is illustrated in an unloading loading configuration in FIG. 11 in which the second cap 36 removed from the housing 30 to allow access to ground coffee beans with the outlet chamber 46.

With the foregoing general discussion of the present in mind, details of construction and operation of the first example coffee grinder 20 will now be described in further detail.

The example shaft assembly 40 comprises a shaft member 120, a shaft collar 122, a first bearing assembly 124, and a second bearing assembly 126. The example shaft member 120 comprises a cap engaging surface 130, a burr drive surface 132, a cap lock portion 134, a disc engaging portion 136, and a shaft ring 138. The example burr adjustment system 56 comprises an adjustment disc 140, an shaft plate 142, an adjustment bias spring 144, and one or more ball assemblies 146. The example adjustment disc 140 defines a shaft engaging portion 148. The example shaft plate 142 defines a first side 150 and a second side 152. A plate projection 160 extends from the first side 150 of the example adjustment disc 140, and one or more detent indents 170 and one or more indicia 172 are formed in the second side 152 of the example adjustment disc 140.

The example fixed burr 52 defines a fixed burr inner surface 180 and a fixed burr outer surface 182. The example movable burr 54 defines a movable burr outer surface 190, a movable burr inner surface 192, a plate engaging surface 194, a shaft through hole 196, and a drive cavity 198 (FIG. 13B). The example movable burr inner surface 192 defines a shaft through hole 196 through which the shaft member 120 extends.

The example housing 30 is configured to support the fixed burr 52 within the grinding chamber 42, and the example shaft assembly 40 is configured to support the movable burr 54 within the grinding chamber 42.

In particular, the outer surface 182 of the fixed burr 52 engages the fixed burr support surface 74 defined by the first housing member 60. The ring screws 66 secure the fixed burr retaining ring 64 to the first housing member 30 such that the fixed burr 52 is rigidly supported within the grinding chamber 42 such that movement of the fixed burr 52 relative to the first housing member 60 is substantially prevented. It should be noted that the example first and second housing members 60 and 62 are joined by complementary threaded surfaces. However, the housing 30 is formed as shown by separate first and second housing members 60 and 62 for manufacturing considerations, and these two members 60 and 62 may be formed by as single part to form the housing 30.

To movably support the example shaft member 120 relative to the first housing member 60, the first and second bearing assemblies 124 and 126 are supported by the first and second bearing notches 82 and 84 of the shaft support 70, while the example shaft member 120 is supported by the bearing assemblies 124 and 126 such that a portion of the shaft member 120 is arranged within the shaft passageway 80 defined by the shaft support 70. As will be described in further detail below, the shaft collar 122 is arranged between the first bearing assembly 124 and the first cap 34 and the shaft ring 138 is held between the shaft collar 122 and the button retainer 232 such that movement of the longitudinal movement of the shaft member 120 along the system axis 22 during normal use of the coffee grinder 20 is inhibited. However, axial rotation of the shaft member 120 about the system axis 22 is allowed, and the bearing assemblies 124 and 126 support the shaft member 120 during such axial rotation.

The movable burr 54 is supported relative to the shaft member 120 such that axial rotation of the shaft member 120 results in axial rotation of the movable burr 54 and such that a grinding space G is defined between the fixed burr inner surface 180 and the movable burr outer surface 190. The fixed burr inner surface 180 and movable burr outer surface 190 are sized, dimensioned, configured, and supported relative to each other to grind whole coffee beans that are gravity feed from the inlet opening 30 and through the grinding space G.

Figure 12:
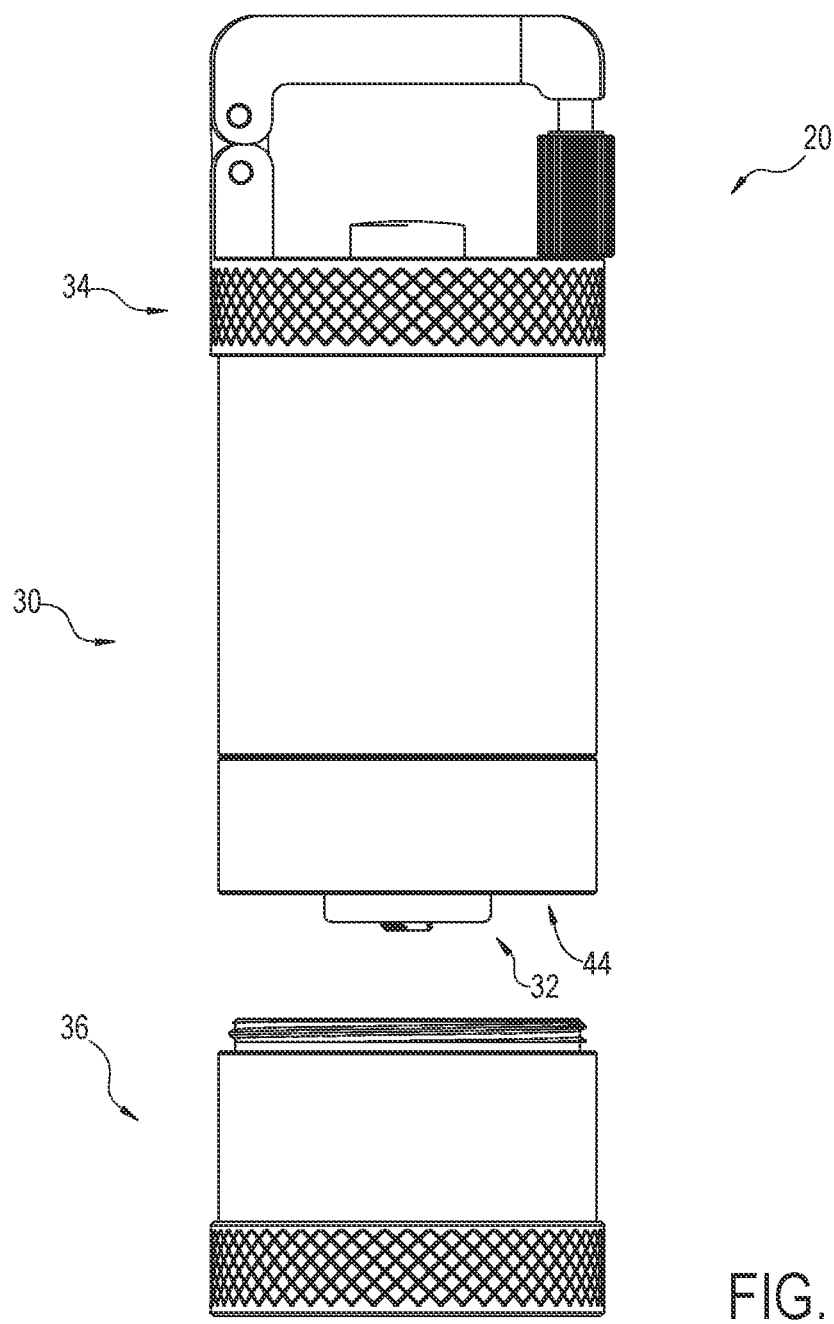
FIG. 12 is a front elevation view of the first example coffee grinder in an unloading configuration.
Figure 19:
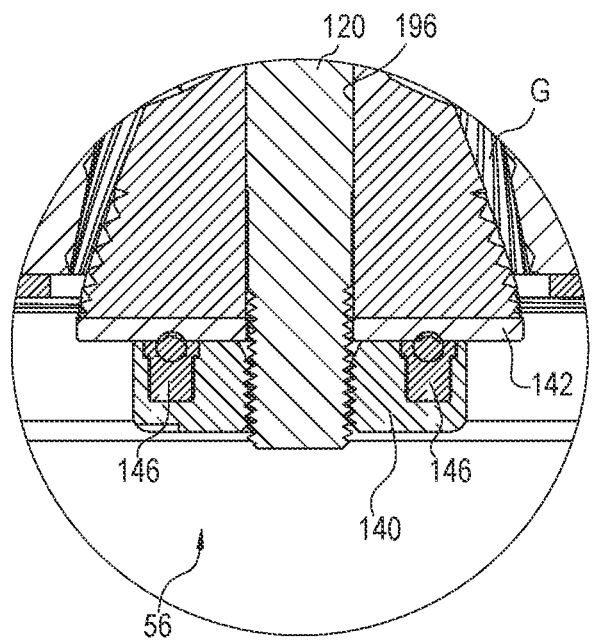
FIG. 19 is a detail view of FIG. 15 illustrating the burr adjustment system in a coarse configuration.
Figure 20:
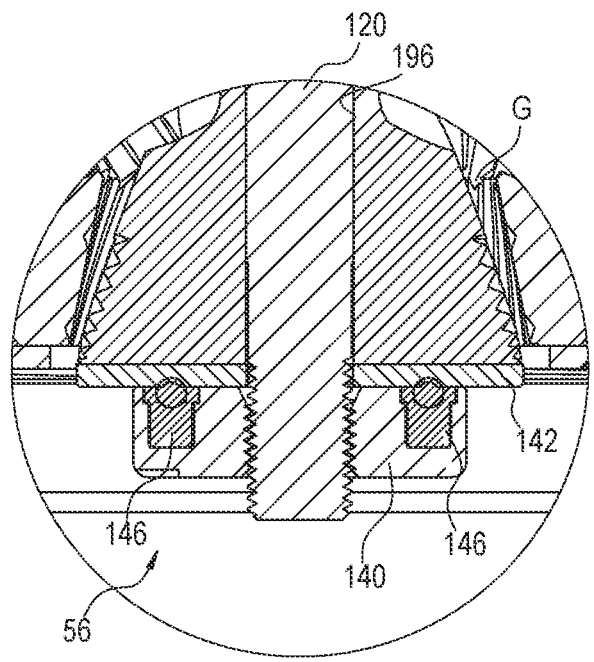
FIG. 20 is a detail view of FIG. 18 illustrating the burr adjustment system in the fine configuration.

In the example coffee grinder 20, the movable burr 54 is secured to the shaft member 120 by the burr adjustment system 56. Different angular relationships of the adjustment disc 140 relative to the shaft plate 142 displaces the shaft member 120 relative to the housing 30 to alter a volume and/or a cross-sectional area of the grinding space G as shown by a comparison of FIGS. 19 and 20. FIG. 19 illustrates a larger volume of the grinding space G that would correspond to a coarse grind, while FIG. 20 illustrates a smaller volume of the grinding space G that would correspond to a fine grind. With the second cap 36 removed as shown in FIG. 12, the adjustment disc 140 is configured to be rotated by hand or with a tool relative to the shaft plate 142 to alter the volume of the grinding space G.

More specifically, the disc engaging portion 136 of the shaft member 120 is externally threaded, and the shaft engaging portion 148 of the adjustment disc 140 is internally threaded to mate with the disc engaging portion 136. The shaft plate 142 is supported between the adjustment disc 140 and the movable burr 54 with the first side 150 of the shaft plate 142 in contact with the plate engaging surface 194 to inhibit movement of the movable burr 54 in one direction along the system axis 22.

The burr drive surface 132 is configured (e.g., with a flat surface) to engage the drive hole 162 in the drive plate 142 such that axial rotation of the shaft member 120 causes axial rotation of the drive plate 142. Axial rotation of the drive plate 142 causes the plate projection 160 on the drive plate 142 to revolve around the longitudinal axis 22. The plate projection 160 engages the drive cavity 198 in the movable burr 54 such that the shaft plate 142 and the movable burr 54 axially rotate together. Accordingly, rotation of the shaft member 120 is transferred to the movable burr 52 through the shaft plate 142.

The ball detent assemblies 146 are supported by the adjustment disc 140 to engage the second side 152 of the shaft plate 142. In particular, each of the ball detent assemblies 146 is arranged to engage one of the detent indents 152 to fix a desired angular relationship between the adjustment disc 140 and the shaft plate 142. The adjustment bias spring 144 is arranged to engage the movable burr 54 to bias the shaft member 120 away from the first housing member 60 and thus hold the shaft plate 140 against the shaft plate 142, ensuring that the ball detent assemblies 146 engage the detent indents 170 with sufficient force to secure the adjustment disc 140 in the desired angular relationship with the shaft plate 142.

So assembled, the fixed burr 52 is rigidly supported by the housing 30, and axial rotation of the shaft member 120 relative to the housing 30 causes rotation of the movable burr 54 relative to the fixed burr 54. The burr adjustment system 56 allows adjustment of the grinding space G through a range of volumes between a finest grind and a coarsest grind.

The example first cap 34 is configured to facilitate axial rotation of the shaft member 120 relative to the housing 30 to operate the grinding assembly 32. The example first cap 34 is also configured to allow release of the first cap 34 from the housing 30 to allow access to the grinding chamber 42 to allow whole or partially ground coffee beans to introduced into the grinding chamber 42 through the inlet opening 40 defined by the housing 30.

In particular, the example release support portion 90 of the first cap 34 defines a button passageway 220 defining a button guide surface 222 and a retainer engaging surface 224. In addition, the example release assembly 92 comprises a release button 230, a button retainer 232, one or more lock members 234, and a release return spring 236. The example release button 230 defines a release groove 242 and a bearing surface 244. The example button retainer 232 defines one or more lock openings 250, a shaft engaging surface 252, a passageway engaging surface 254, a bearing flange 256, a collar bearing surface 258, a shaft end receiving cavity 260, and a ring notch 262.

Figure 15:
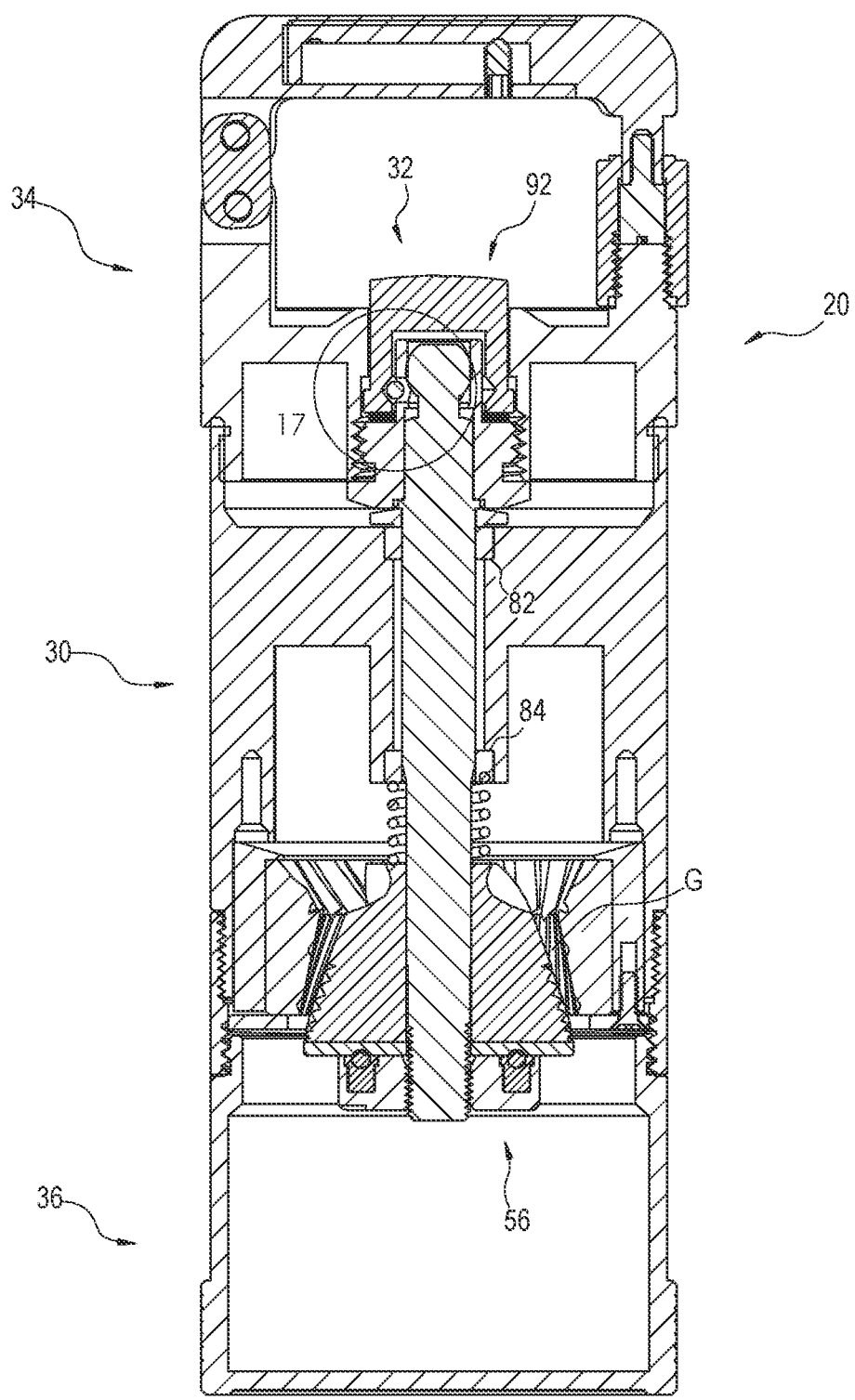
FIG. 15 is a section view similar to FIG. 14 illustrating the release button in a depressed position.
Figure 16:
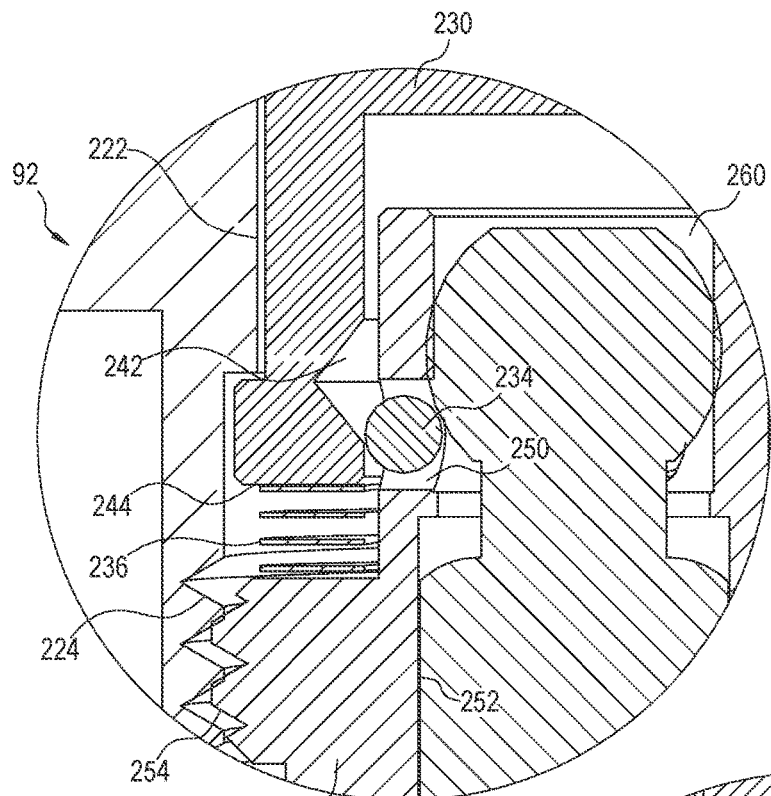
FIG. 16 is a detail of FIG. 14 illustrating a release system in a fixed configuration.
Figure 17:
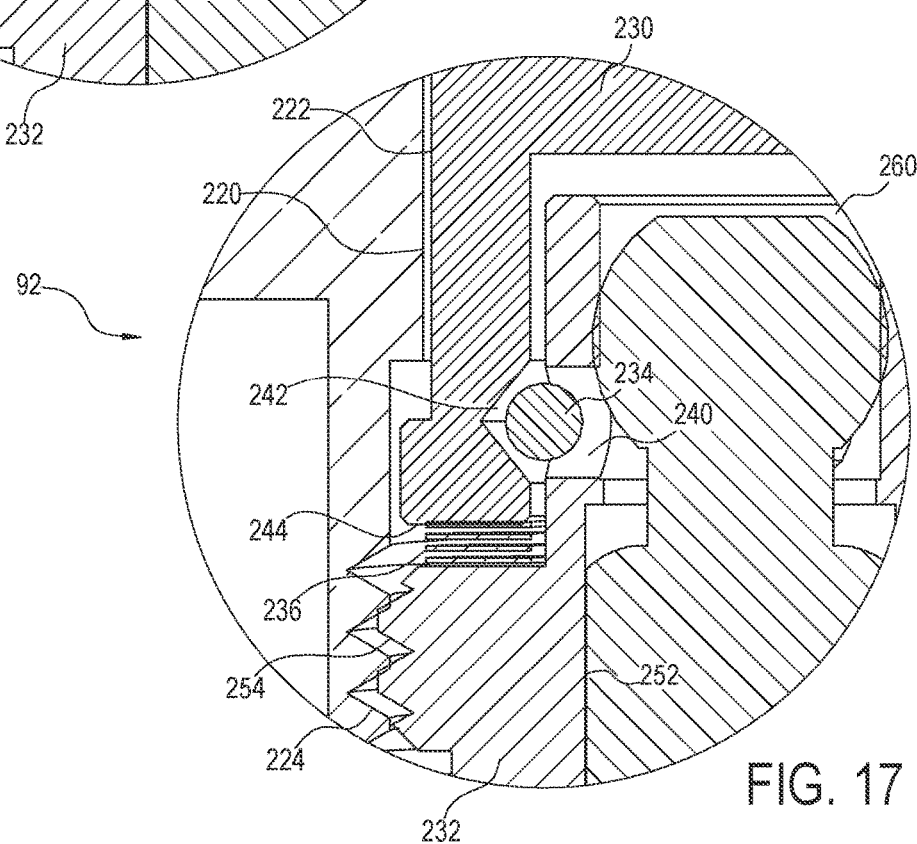
FIG. 17 is a detail of FIG. 16 illustrating the release button in an un-fixed configuration.

To form the example release assembly 92, at least a portion of the release button 230 is arranged within the button passageway 220 such that the button guide surface 222 allows movement of the release button 230 between an un-depressed position (FIGS. 14 and 16) and a depressed position (FIGS. 15 and 17). FIGS. 14 and 15 further illustrate that passageway engaging surface 254 of the button retainer 232, which is externally threaded, engages the retainer engaging surface 224 of the release support portion 90, which is internally threaded, such that the button retainer 232 limits movement of the release button 230 relative to the first cap 34 between the un-depressed and depressed positions. The release return spring 236 is arranged between the button retainer 232 and the bearing surface 244 of the release button 230 such that the release button 230 is biased into the un-depressed position. In this configuration, the cap lock portion 134 of the shaft member 120 is arranged within the shaft end receiving cavity 260 and held there by the lock members 234 so long as the release button 230 is in the un-depressed position as will be described in further detail below.

Figure 21:
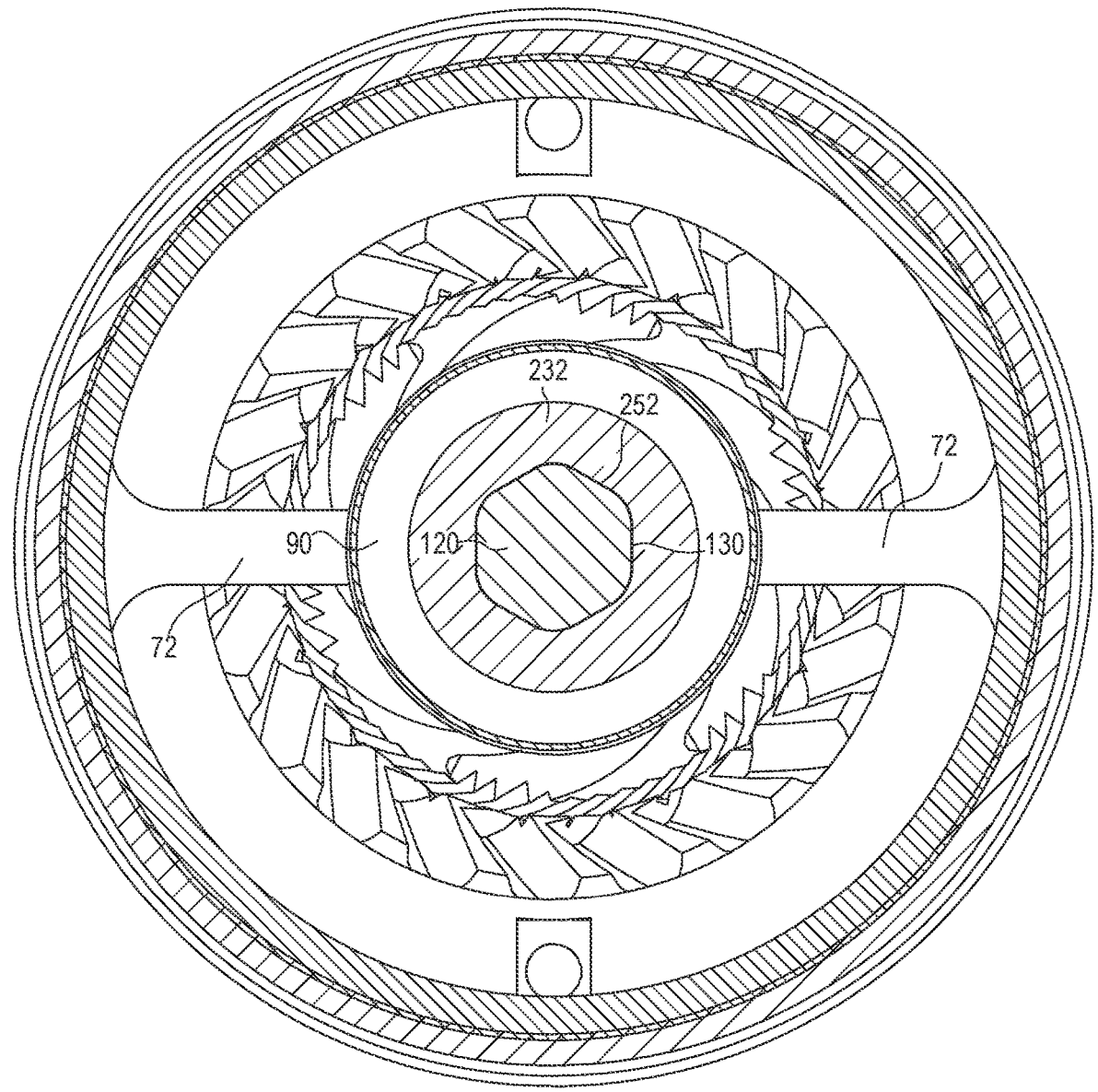
FIG. 21 is a section view taken along lines 21-21 in FIG. 3.
Figure 22:
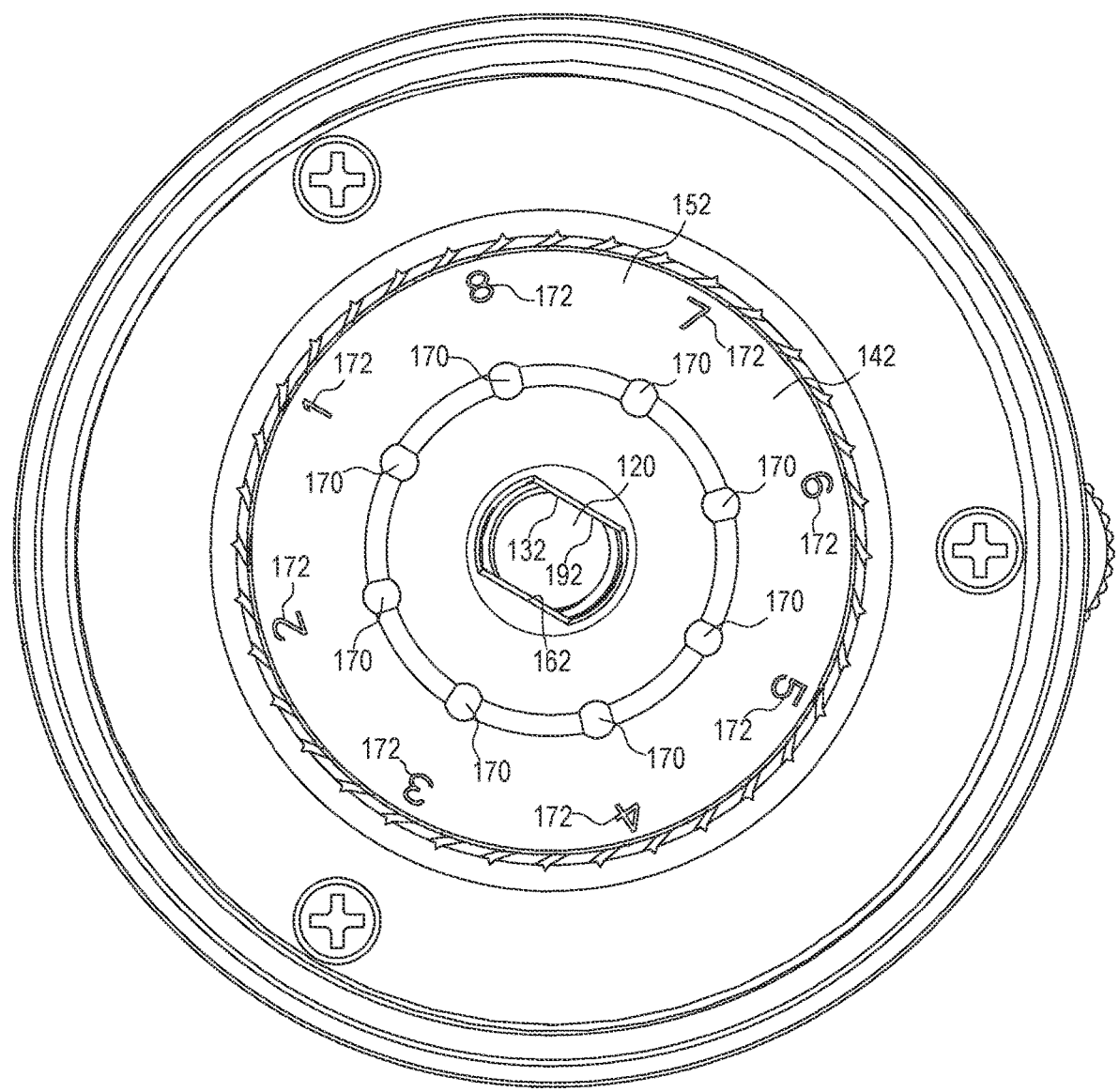
FIG. 22 is a bottom plan view with a second cap and adjustment disc removed.
Figure 23:
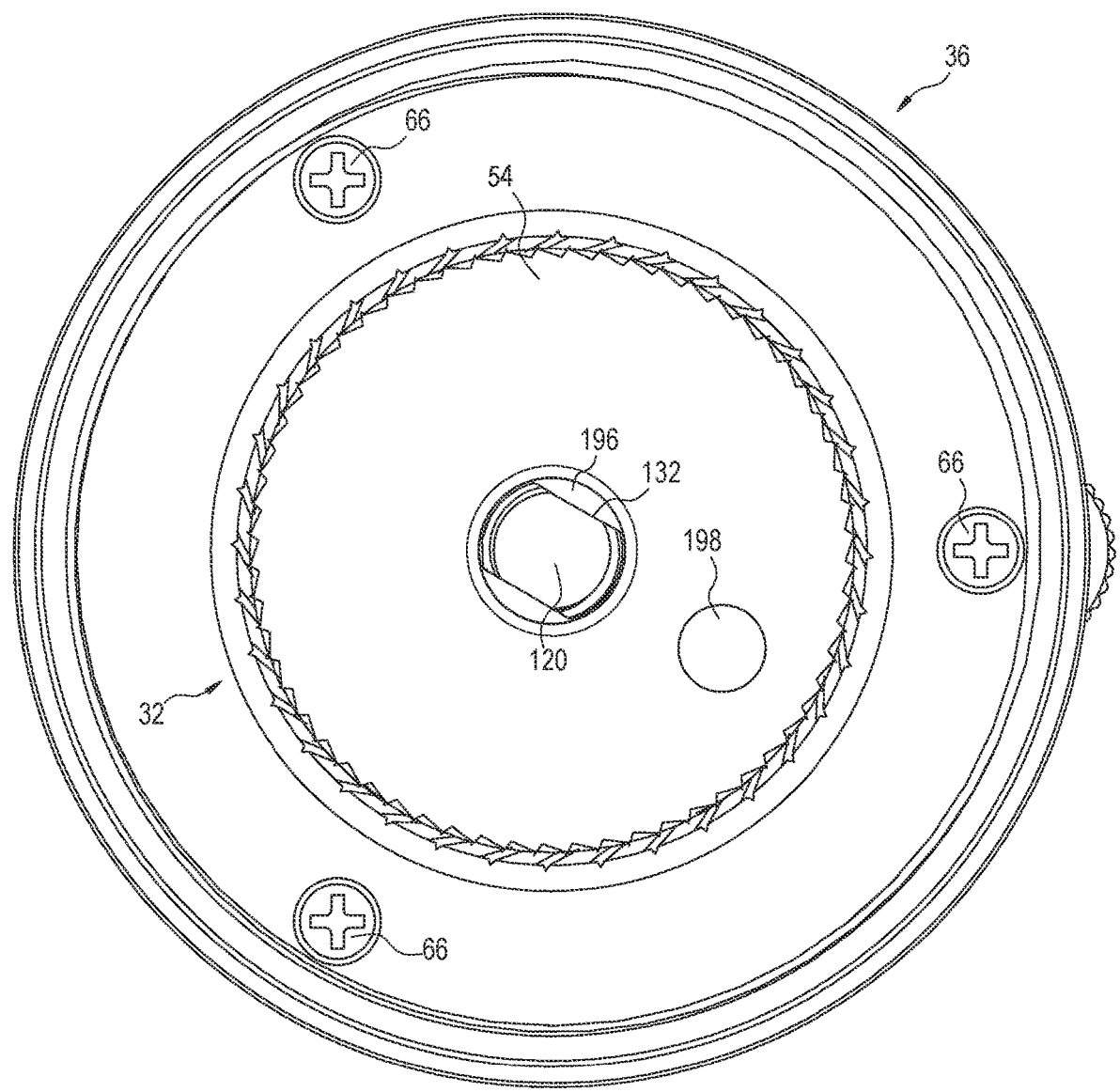
FIG. 23 is a section view taken along lines 23-23 in FIG. 3.
Figure 24:
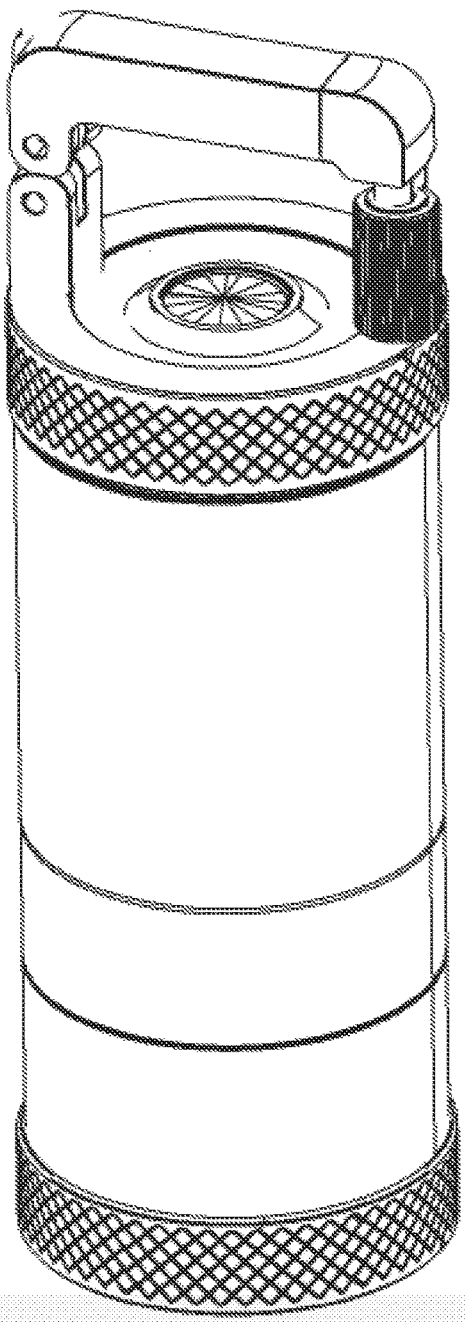
FIG. 24 is a perspective view of a second example coffee grinder of the present invention.
Figure 25:
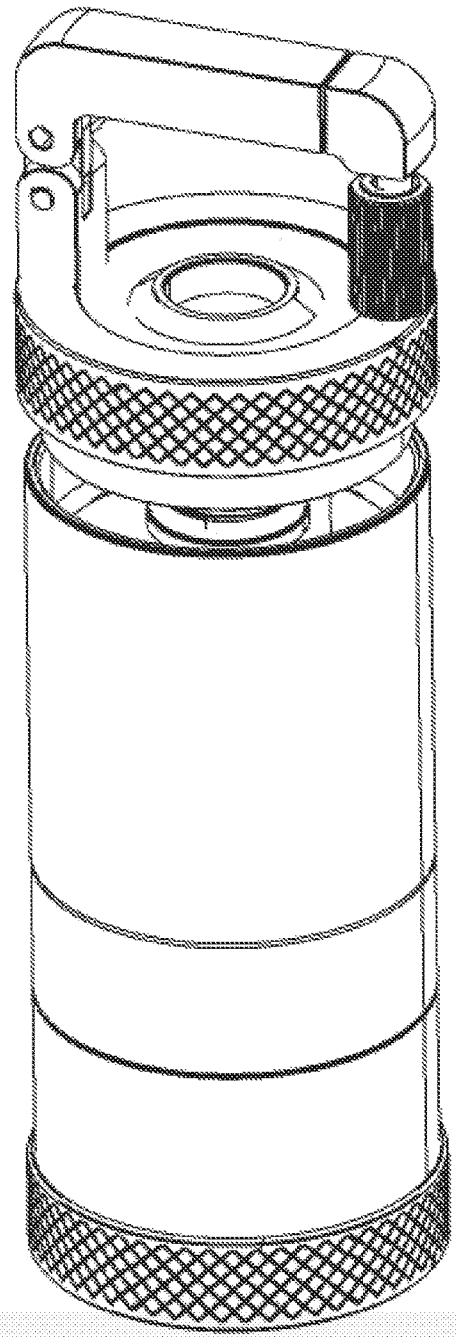
FIG. 25 is a perspective view of the second example coffee grinder with an activation button thereof depressed to allow removal of a grinder cover.
Figure 26:
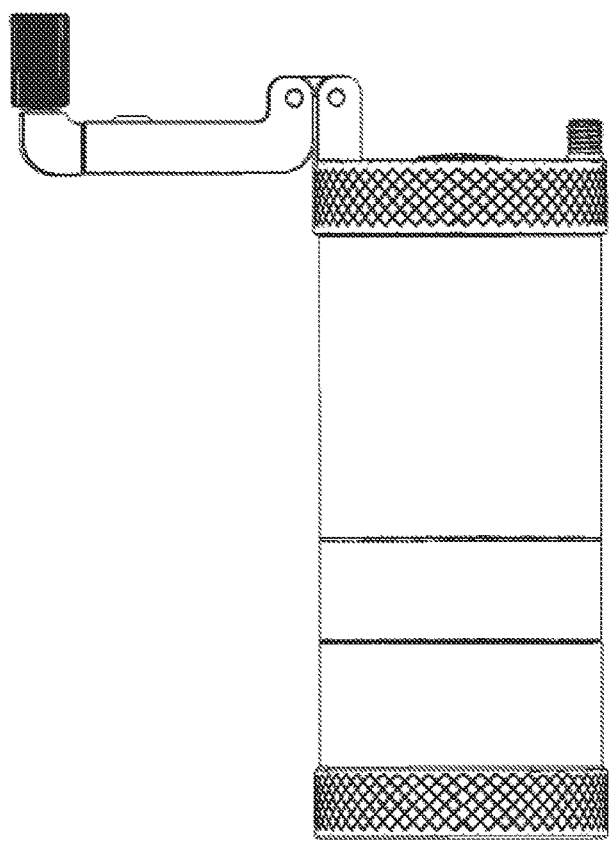
FIG. 26 is a perspective view showing a grinder handle of the second example coffee grinder in a non-extended position.
Figure 27:
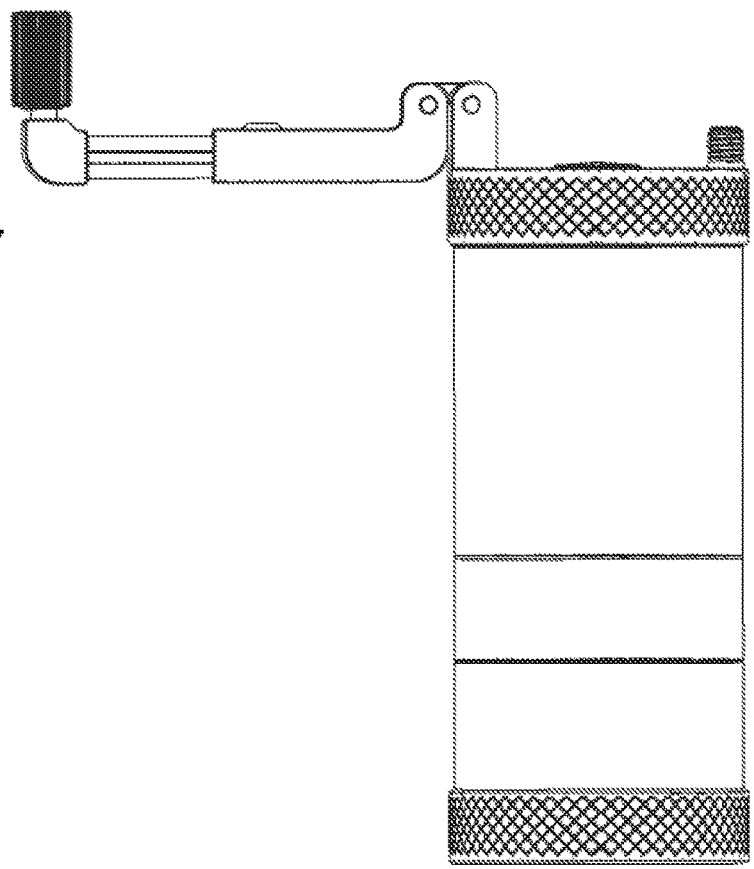
FIG. 27 is a perspective view showing a grinder handle of the second example coffee grinder in an extended position.

In particular, the lock members 234 are supported by the lock openings 250 of the button retainer 232 such that, when the release button 230 is in the un-depressed position, the lock members 234 engage the button member 230 and the cap lock portion 134 of the shaft member 120 substantially to prevent movement of the first cap 34 along the system axis 22 relative to the shaft member 120 towards the housing 30. In the un-depressed position, the release button thus inhibits movement of the first cap 34 away from the housing 30 along the system axis 22. However, the release button 230 and the cap lock portion 134 are sized, dimensioned, and arranged relative to each other such that the first cap 34 may axially rotate about the system axis 22 relative the housing 30. Further, because the button retainer 232 is secured to the release support portion 90 and the shaft engaging surface 252 engages the cap engaging surface 130 of the shaft member 120 (FIG. 21), rotation of the first cap 34 relative to the housing 30 causes rotation of the shaft member 120 relative to the housing 30.

A perimeter edge 260 of the housing 30 defining the inlet opening 40 is sized, dimensioned, and arranged to interact with a perimeter edge 262 of the first cap 34 with a suitable tolerance to facilitate proper alignment with the longitudinal axes of the housing 30 and the first cap 34 during rotation of the first cap 34 relative to the housing 30.

To detach the first cap 34 from the housing 30, the release button 230 is arranged in the depressed position such that the cap lock portion 134 may displace the lock members 234 radially outwardly from the system axis 22 into the release groove 242 in the release button 230. With the lock members 234 displaced radially outwardly, the lock members 234 no longer interfere with movement of the cap lock portion 134 relative to shaft member 120, allowing the first cap 34 to be removed from the housing 30 as shown in FIG. 11.

The example rotation assembly 94 of the first cap 34 comprises a handle assembly 320, a handle hinge 322, and a handle lock 324. The example handle assembly 320 comprises a first handle member 330, a second handle member 332, and a detent set screw 334. First and second handle recesses 336 and 338 are formed in the second handle member 332. The example hinge 322 comprises a link member 340 and first and second hinge pins 342 and 344.

The first and second handle members 330 and 332 engage each other such that the second handle member 332 moves between retracted (FIG. 9) and extended (FIG. 10) positions relative to the first handle member 332. The detent set screw 334 engages the first handle recess 336 to detachably secure the second handle member 332 in the retracted position and the second handle recess 338 to detachably secure the second handle member 332 in the extended position. Deliberation application of manual force on the second handle member 332 overcomes the locking force applied by the detent set screw 334 to displace the second handle member 332 relative to the first handle member 330 between the retracted and extended positions.

The example first hinge pin 342 rotatably attaches the link member 340 to the first cap 34, and the example second hinge pin 344 rotatably attaches the link member 340 to the first handle member 332. The handle hinge thus allows the handle assembly 94 to be rotated between an inward position (FIGS. 1-4 and 7) and an outward position (FIGS. 9 and 10) relative to the first cap 34.

The example handle lock 324 comprises a lock portion 350 formed on the second handle member 332, a lock projection 352 extending from the first cap 34, a grip member 354, and a grip retainer 356. The example lock projection 352 defines an external threaded surface 360, and the example grip member 354 defines an internal threaded surface 362.

To form the example handle lock 324, the grip retainer 356 is arranged to engage the lock portion 350 of the second handle member 332 such that the grip member 354 is rotatably secured to the second handle member 332 and such that the grip member 354 may move within a limited range along a handle lock axis L defined by the lock portion 350 relative to the lock portion 350.

Figure 7:
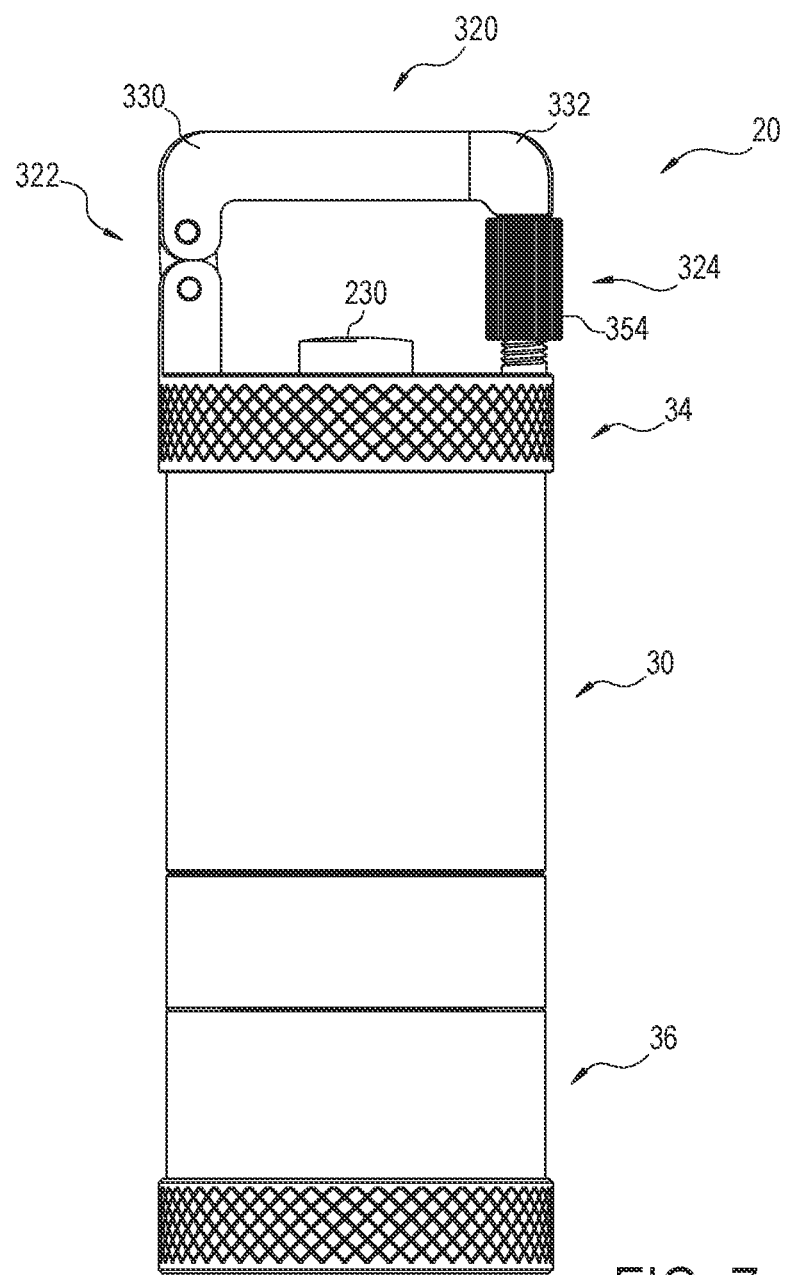
FIG. 7 is a front elevation view of the first example coffee grinder with the handle assembly thereof in an unlocked configuration.
Figure 8:
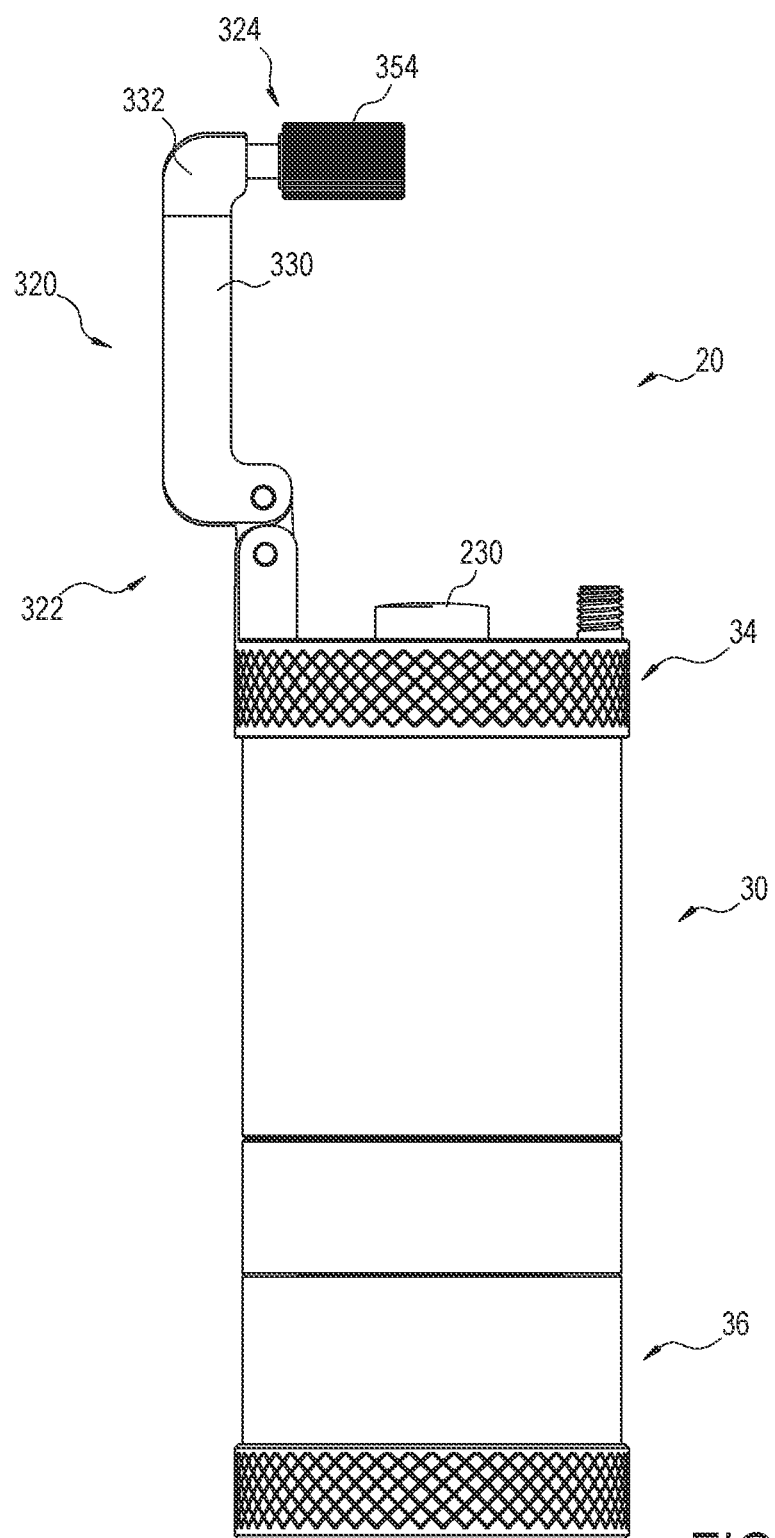
FIG. 8 is a front elevation view of the first example coffee grinder illustrating the handle assembly thereof being displaced from an inward configuration to an outward configuration.
Figure 9:
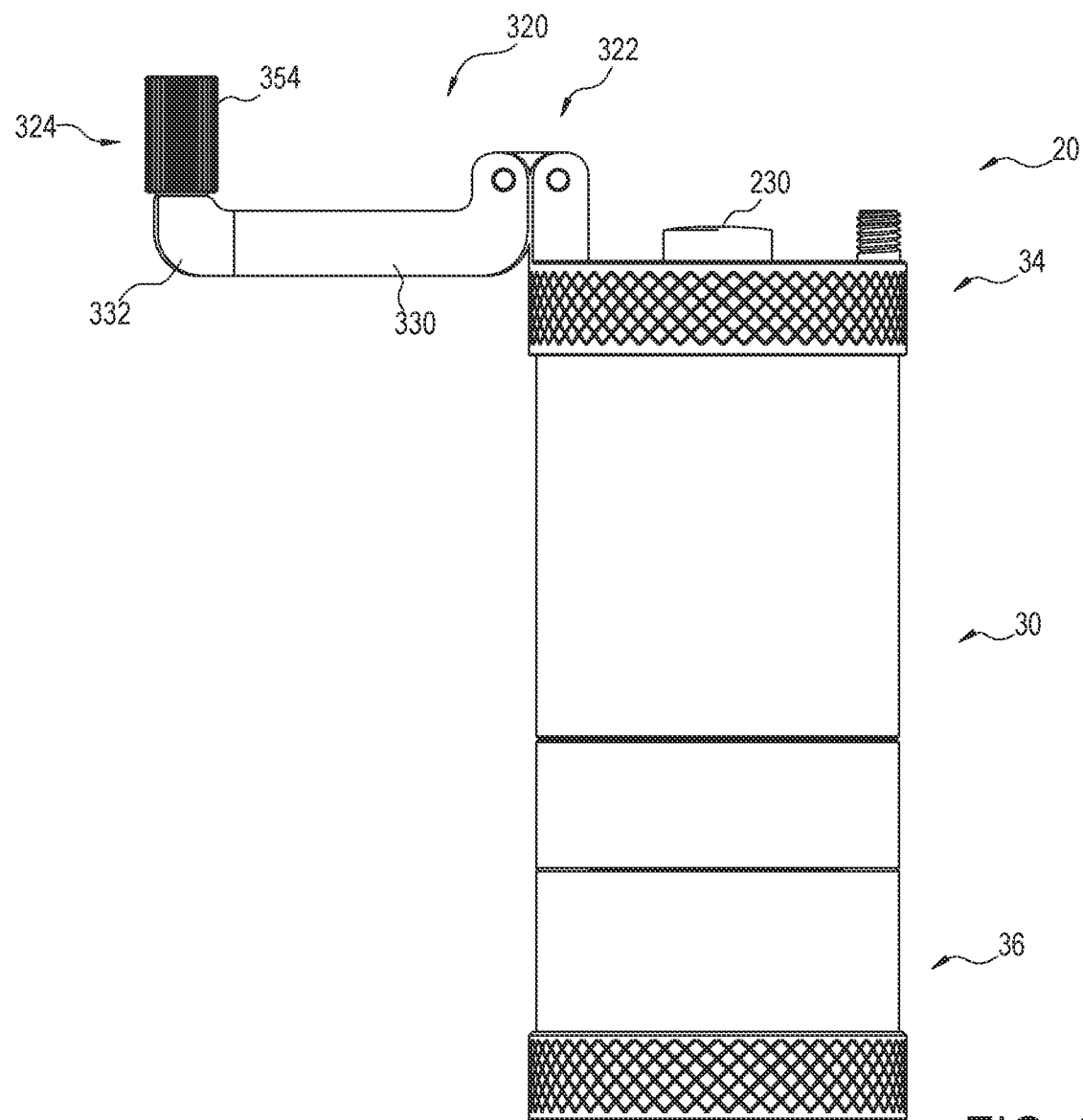
FIG. 9 is a side elevation view of the first example coffee grinder illustrating the handle assembly thereof being displaced from the inward configuration to the outward configuration.

When the handle assembly 320 is in the retracted configuration and the inward position as shown in FIGS. 1-4 and 7, the internal threaded surface 362 of the grip member 354 is aligned with the external threaded surface 360 of the lock projection 352. Axial rotation of the grip member 354 in a first direction allows the grip member 354 to be threaded onto the lock projection 352 to place the handle lock 94 in a locked configuration as shown in FIGS. 1-4, while axial rotation of the grip member 354 in a second direction allows the grip member 354 to be threaded off of the lock projection 352 to place the handle lock 94 in an locked configuration as shown in FIG. 7.

Further, because the grip retainer 356 allows axial rotation of the grip member 354 relative to the lock portion 350 of the second handle member 332, the grip member 354 may be gripped while turning the handle assembly 320 such that the handle assembly 320 causes axial rotation of the first cap 34 relative to the housing 30 to cause axial rotation of the shaft member 120 to operate the grinding assembly 32.

Figure 18:
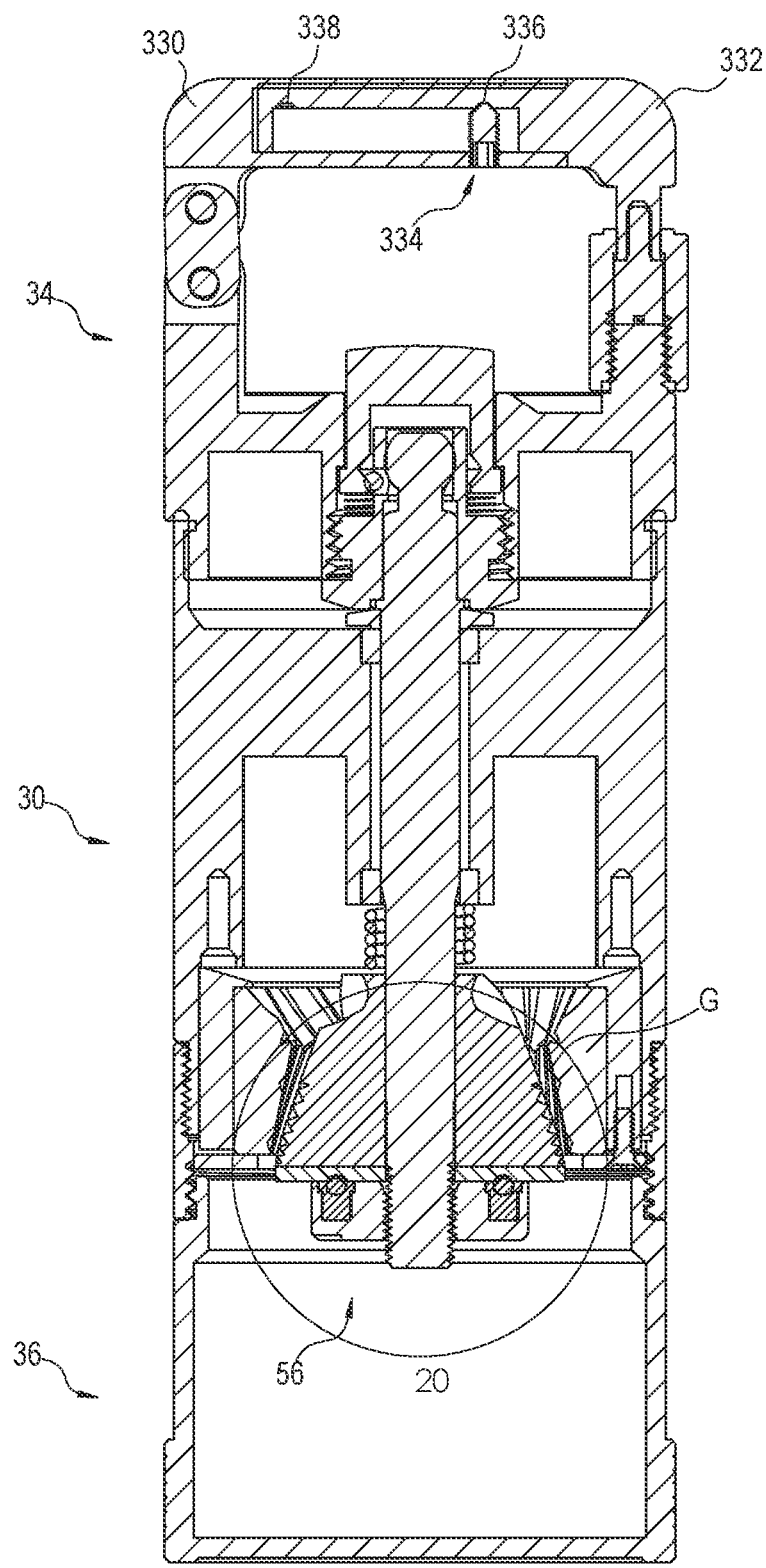
FIG. 18 is a section view similar to FIG. 15 illustrating a burr adjustment system of the present invention in a fine configuration.

FIGS. 14 and 18 illustrate that a perimeter edge 370 of the housing 30 defining the outlet opening 44 engages a perimeter edge 372 of the second cap 36 to detachably attach the second cap 36 to the housing 30. A friction fit may be formed between the perimeter edges 370 and 372 to detachably attach the second cap 36 to the housing 30 or, as shown in FIGS. 14 and 18, complementary threaded surfaces may be formed on the edges 370 and 372 to form a more secure attachment of the second cap 36 to the housing 30.

II. Additional Considerations

The present invention may be directed to a unique method of grinding coffee beans, or other materials that require grinding. In the example depicted and described in FIGS. 23-26, an end of the device is converted into the grinding handle mechanism as well as the mechanism for activating the grinding components. The present invention thus solves the need for a more practical and functional way to grind coffee without having a grinding handle that is a separate component from the grinding mechanism and with the use of a minimum number of functioning parts, at a reasonable cost to manufacture, and by employing only readily available materials.

As disclosed FIGS. 23-26, the present invention employs new and improved systems and methods of attaching and removing a rotating covering mechanism by applying physical force to a button such that, once that force is applied, the mechanism is released, allowing the rotating cover to be removed.

Using the systems and methods of the present invention, a rotating covering mechanism is attached and removed to allow the rotating covering mechanism to rotate either clockwise or counter-clockwise without being encumbered by screw threads.

The systems and methods of the present invention may be configured to allow a rotating covering mechanism to be attached and removed such that the rotating cover may stay attached to a container or cylinder and the rotating motion isn't impeded by friction and friction doesn't impede motion after prolonged use.

The new and improved portable coffee grinder of the present invention may be embodied to employ an extendable grinder handle. Extending the grinder handle allows the user to provide less force to accomplish the devices primary function of grinding coffee beans.

A new and improved portable coffee grinder of the present invention may be configured to comprise a grinder handle that is retractable so that the device maintains a compact form and can be re-attached to the end cap allowing for transportability (e.g., retracts for carrying).

In one example as shown in FIGS. 23-26, the portable coffee grinder of the present invention may be embodied to include an end cap (cover, lid) that can be easily removed to allow the end user to insert coffee beans for grinding. The removal device may be configured as a push button mechanism that allows the end cap to rotate the grinding burrs (and grind coffee) while still keeping the end cap (cover, lid) securely in place during the grinding process and while transporting the device.

The invention may also be configured to include an extendable carabiner mechanism that allows the user to apply less physical force to activate the grinding device then what would have been required if the mechanism wasn't extendable. This same carabiner mechanism is also retractable so that it can be reduced in size for easier portability and secured in a carrying position.

The present invention provides an improved method for grinding coffee, wherein the same device can be used for traditional and more obvious coffee storage and grinding applications. As such, the general purpose of the present invention, which will be described subsequently in greater detail, is to provide a new and improved combination of components, which has the implied advantages of the prior art, several disadvantages of the prior art removed and key functional improvements added.

The present invention thus provides an improved device that improves the functionality of a portable device for grinding coffee. The present invention further provides a new and improved method of accessing the grinding compartment (hopper) in which the coffee beans are contained for grinding. The present invention further provides a new and improved method of extending the grinding handle to decrease the mechanical force required to effectively grind coffee beans.

What is claimed is:

1. A grinding system for grinding raw material to obtain ground material, the grinding system comprising:
    a housing defining a grinding chamber;
    a grinding assembly comprising a plurality of burrs; and
    a first cap; and
    a rotation assembly comprising
        at least one handle member rotatably supported by the first cap,
        a grip member rotatably supported by at least one of the at least one handle member, and
        a lock projection supported by the first cap, where the grip member engages the lock projection to detachably attach the at least one handle member relative to the first cap; wherein
    the grinding assembly is supported relative to the housing such that each of the plurality of burrs is arranged within the grinding chamber;
    the first cap is detachably attachable to the grinding assembly such that
        with the first cap attached to the grinding assembly, rotation of the first cap relative to the housing causes rotation of at least one of the plurality of burrs relative to at least one other of the plurality of burrs, and
        with the first cap detached from the grinding assembly, the raw material may be arranged within the grinding chamber; and
    when the grip member is detached from the lock projection, the at least one handle member is rotated outwardly relative to the first cap to facilitate rotation of the first cap relative to the housing; and
    when the at least one handle member is rotated inwardly relative to the first cap and the grip member is attached to the lock projection, the at least one handle member defines a closed loop to facilitate carrying of the grinding system.

2. A grinding system as recited in claim 1, in which the rotation assembly comprises first and second handle members, where the second handle member is movably supported by the first handle member for movement between retracted and extended positions relative to the first handle member.

3. A grinding system as recited in claim 2, in which the rotation assembly further comprises a detent supported by the first handle member, where the detent engages the second handle member to secure the second handle member in the retracted and extended positions.

4. A grinding system as recited in claim 1, in which the rotation assembly further comprises:
    a hinge that rotatably supports the at least one handle member relative to the first cap; wherein
    the hinge allows rotation of the at least one handle member relative to the first cap between inward and outward positions.

5. A grinding system as recited in claim 1, further comprising a second cap detachably attachable to the housing, wherein:
    with the second cap attached to the housing, an outlet chamber is formed for holding the ground material; and
    with the second cap detached from the housing, the ground material may be removed from the outlet chamber.

6. A grinding system as recited in claim 1, in which:
    the grinding assembly comprises a shaft member supported for axial rotation about a longitudinal axis relative to the housing; and
    the first cap comprises a release button supported for movement between first and second positions relative to the first cap, wherein:
    in the first position, the release button inhibits movement of the first cap along the longitudinal axis relative to the housing while allowing axial rotation of the first cap about the longitudinal axis relative to the housing; and
    in the second position, the release button allows movement of the first cap along the longitudinal axis relative to the housing to allow the first cap to be detached from the housing.

7. A grinding system as recited in claim 6, further comprising at least one lock member supported for movement between radial inward positions and radial outward positions relative to the release button, wherein:
    the at least one lock member interferes with relative movement between the release button and the shaft member when in the radial inward position; and the at least one lock member does not interfere with relative movement between the release button and the shaft member when in the radial outward position.

8. A grinding system as recited in claim 7, in which a groove is formed in the release button, where the groove allows the at least one lock member to move into the radial outward position when the release button is in the depressed position.

9. A grinding system as recited in claim 7, in which a groove is formed in the release button, where the groove allows the at least one lock member to move into the radial outward position when the release button is in the depressed position.

10. A grinding system as recited in claim 1, further comprising a rotation assembly comprising first and second handle members, wherein:
the first handle member is operatively connected to the first cap; and
the second handle member is movably supported by the first handle member for movement between retracted and extended positions relative to the first handle member.

11. A grinding system as recited in claim 10, in which the rotation assembly further comprises a detent supported by the first handle member, where the detent engages the second handle member to secure the second handle member in the retracted and extended positions.

12. A grinding system as recited in claim 10, in which the rotation assembly further comprises:
a grip member rotatably supported by second handle member; and
a lock projection supported by the first cap; wherein
the grip member engages the lock projection to secure the at least one handle member relative to the first cap.

13. A grinding system as recited in claim 1, further comprising a second cap detachably attachable to the housing, wherein:
with the second cap attached to the housing, an outlet chamber is formed for holding the ground material; and
with the second cap detached from the housing, the ground material may be removed from the outlet chamber.

14. A method of grinding raw material to obtain ground material, the method comprising the steps of:
providing a housing defining a grinding chamber;
providing a grinding assembly comprising
a plurality of burrs; and
a shaft member comprising a lock portion and supported for axial rotation about a longitudinal axis relative to the housing; and
providing a first cap comprising a release button assembly comprising
a release button,
a button retainer supported by the first cap, where, when the first cap and the grinding assembly are supported by the housing, the button retainer supports the release button for movement relative to the first cap along the shaft axis between first and second positions, and
at least one lock member supported by the button retainer and the release button, where
when in the first position, the release button holds the at least one lock member against the lock portion of the shaft member to inhibit movement of the first cap along the longitudinal axis relative to the housing while allowing axial rotation of the first cap about the longitudinal axis relative to the housing; and
when in the second position, the release button allows the at least one lock member to disengages from the lock portion of the shaft member to allow movement of the first cap along the longitudinal axis relative to the housing to allow the first cap to be detached from the housing;
supporting the grinding assembly relative to the housing such that each of the plurality of burrs is arranged within the grinding chamber;
displacing the release button from the first position to the second position to detach the first cap from the grinding assembly;
with the first cap detached from the grinding assembly, arranging the raw material within the grinding chamber;
detachably attaching the first cap attached to the grinding assembly; and
with the first cap attached to the grinding assembly, rotating the first cap relative to the housing to cause rotation of at least one of the plurality of burrs relative to at least one other of the plurality of burrs.

15. A method as recited in claim 14, further comprising the steps of:
providing first and second handle members;
movably supporting the second handle member relative to the first handle member between retracted and extended positions.

16. A method as recited in claim 15, further comprising the steps of:
rotatably supporting the first handle member relative to the first cap; and
rotatably supporting a grip member on the second handle member; and
supporting a lock projection on the first cap;
engaging the grip member with the lock projection to secure the first and second handle members relative to the first cap.

17. A grinding system for grinding raw material to obtain ground material, the grinding system comprising:
a housing defining a grinding chamber;
a grinding assembly comprising
a shaft member supported for axial rotation about a longitudinal axis relative to the housing, the shaft member comprising a lock portion and defining a longitudinal axis, and
a plurality of burrs; and
a first cap comprising a release button assembly comprising
a release button,
a button retainer supported by the first cap, where, when the first cap and the grinding assembly are supported by the housing, the button retainer supports the release button for movement relative to the first cap along the longitudinal axis between first and second positions, and
at least one lock member supported by the button retainer and the release button; wherein:
the grinding assembly is supported relative to the housing such that each of the plurality of burrs is arranged within the grinding chamber;
when in the first position, the release button holds the at least one lock member against the lock portion of the shaft member to inhibit movement of the first cap along the longitudinal axis relative to the housing while allowing axial rotation of the first cap about the longitudinal axis relative to the housing; and when in the second position, the release button allows the at least one lock member to disengages from the lock portion of the shaft member to allow movement of the first cap along the longitudinal axis relative to the housing to allow the first cap to be detached from the housing;

with the first cap attached to the grinding assembly, rotation of the first cap relative to the housing causes rotation of at least one of the plurality of burrs relative to at least one other of the plurality of burrs, and with the first cap detached from the grinding assembly, the raw material may be arranged within the grinding chamber.

18. A grinding system for grinding raw material to obtain ground material, the grinding system comprising:
   a housing defining a grinding chamber;
   a grinding assembly comprising
      a plurality of burrs, and
      a shaft member supported for axial rotation about a longitudinal axis relative to the housing;
   a first cap comprising a release button supported for movement between first and second positions relative to the first cap, where
      in the first position, the release button inhibits movement of the first cap along the longitudinal axis relative to the housing while allowing axial rotation of the first cap about the longitudinal axis relative to the housing; and
      in the second position, the release button allows movement of the first cap along the longitudinal axis relative to the housing to allow the first cap to be detached from the housing; and
   at least one lock member supported for movement between radial inward positions and radial outward positions relative to the release button, where
      the at least one lock member interferes with relative movement between the release button and the shaft member when in the radial inward position; and
      the at least one lock member does not interfere with relative movement between the release button and the shaft member when in the radial outward position; wherein
   the grinding assembly is supported relative to the housing such that each of the plurality of burrs is arranged within the grinding chamber;
   the first cap is detachably attachable to the grinding assembly such that
      with the first cap attached to the grinding assembly, rotation of the first cap relative to the housing causes rotation of at least one of the plurality of burrs relative to at least one other of the plurality of burrs, and
      with the first cap detached from the grinding assembly, the raw material may be arranged within the grinding chamber.

* * * * *